United States Patent
Galitsky

(10) Patent No.: US 11,847,411 B2
(45) Date of Patent: Dec. 19, 2023

(54) OBTAINING SUPPORTED DECISION TREES FROM TEXT FOR MEDICAL HEALTH APPLICATIONS

(71) Applicant: Oracle International Corporation, Redwood Shores, CA (US)

(72) Inventor: Boris Galitsky, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 327 days.

(21) Appl. No.: 17/339,899

(22) Filed: Jun. 4, 2021

(65) Prior Publication Data

US 2022/0035998 A1    Feb. 3, 2022

Related U.S. Application Data

(60) Provisional application No. 63/058,204, filed on Jul. 29, 2020.

(51) Int. Cl.
   *G06F 40/20*    (2020.01)
   *G06F 16/901*   (2019.01)
   *G06N 5/01*     (2023.01)

(52) U.S. Cl.
   CPC .......... *G06F 40/20* (2020.01); *G06F 16/9027* (2019.01); *G06N 5/01* (2023.01)

(58) Field of Classification Search
   None
   See application file for complete search history.

(56) References Cited

U.S. PATENT DOCUMENTS 11,449,515 B1 *  9/2022  Russell ............... G06F 16/90
   2019/0138595 A1 *  5/2019  Galitsky .............. G06N 20/10

OTHER PUBLICATIONS

Albu, Decisional Methods Applied in Medical Domain, the 5th International Symposium on Applied Computational Intelligence and Informatics, 2009, pp. 123-128.
Alder et al., Computer-Based Diagnostic Expert Systems in Rheumatology: Where Do We Stand in 2014? International Journal of Rheumatology, 2014, 10 pages.
Interpretation of Hepatitis B Serologic Test Results, Department of Health and Human Services (2017) Centers for Disease Control and Prevention, Division of Viral Hepatitis, www.cdc.gov/hepatitis, 1 page.

(Continued)

*Primary Examiner* — Stella L. Woo
(74) *Attorney, Agent, or Firm* — Kilpatrick Townsend & Stockton LLP

(57) ABSTRACT

Systems, devices, and methods discussed herein provide improved decision trees (e.g., supported decision trees). A supported decision tree can be generated by generating discourse trees from various documents associated with a subject. One or more decision chains can be generated from each discourse tree, each decision chain being a sequence of elements comprising a premise and a decision connected by rhetorical relationships. A supported decision tree can be generated from the various decision chains, where the nodes of the decision tree are identified from the elements of the plurality of decision chains and ordered based on a set of predefined priority rules. Subsequent input data can be received and the supported decision tree can be traversed to classify the input data.

20 Claims, 15 Drawing Sheets

(56) References Cited

OTHER PUBLICATIONS

Garofalakis et al., Efficient Algorithms for Constructing Decision Trees with Constraints, Proceedings of the 6th ACM SIG KDDI International Conference on Data Mining and Knowledge Discovery (KDD2000), 2000, 5 pages.
Han et al., Data Mining: Concepts and Techniques. New York, NY: Morgan Kaufman, Third Edition, © 2012 by Elsevier Inc., 740 pages.
Hunt et al., Experiments in Induction, New York, Academic Press, 1966, 247 pages.
Hyafil et al., Constructing Optimal Binary Decision Trees is NP-Complete, Information Processing Letters, vol. 5, No. 1, May 1976, pp. 15-17.
Kim et al., Theory and Practice of Decision Tree Induction, Omega, vol. 23, No. 6, 1995, pp. 637-652.
Kotsiantis, Decision Trees: A Recent Overview, Artificial Intelligence Review, vol. 39, 2011, 23 pages.
Mutawa et al., Multilayered Rule-based Expert System for Diagnosing Uveitis, Artificial Intelligence in Medicine, vol. 99, Aug. 2019, 55 pages.
Osei-Bryson, Evaluation of Decision Trees: A Multi-Criteria Approach, Computers & Operations Research, vol. 31, 2004, pp. 1933-1945.
Sanjeevi, Decision Tree Algorithms, Available online at https://medium.com/deep-math-machine-learning-ai/chapter-4-decision-trees-algorithms-b93975f7a1f1, 2017, 11 pages.
Song et al., Decision Tree Methods: Applications for Classification and Prediction, Shanghai Archives of Psychiatry, vol. 27, No. 2, 2015, pp. 130-135.

* cited by examiner

400 elaboration (LeftToRight)
  explanation (LeftToRight)    ◄—— 402
    contrast (RightToLeft)    ◄—— 404
      TEXT:Although there is no cure for type 2 diabetes,
      attribution (RightToLeft)    ◄—— 406
        TEXT:studies show
        enablement (LeftToRight)    ◄—— 408
          TEXT:it is possible for some people
          TEXT:to reverse it.
    evaluation (LeftToRight)    ◄—— 410
      condition (RightToLeft)    ◄—— 412
        TEXT:Through diet changes and weight loss,
        manner-means (LeftToRight)    ◄—— 412
          TEXT:you may be able to reach and hold normal blood sugar levels
          TEXT:without medication.
      TEXT:This does not mean you are completely cured.
  elaboration (LeftToRight)
    TEXT:Type 2 diabetes is an ongoing disease.
    contrast (RightToLeft)    ◄—— 414
      elaboration(RightToLeft)
        same-unit
          condition (LeftToRight)    ◄—— 416
            TEXT:Even if you are in remission,
          joint
            TEXT:which means you are not taking medication
            TEXT:and your blood sugar levels stay in a healthy range,
        TEXT:there is always a chance,
      TEXT:that symptoms will return.
    background (LeftToRight)    ◄—— 418
      TEXT:But it is possible for some people to go years
      elaboration (LeftToRight)
        TEXT:without trouble
        elaboration (LeftToRight)
          TEXT:controlling their glucose and the health concerns.

*FIG. 4* diet changes and weight loss ⇒ condition without medication ⇒ manner-means sugar(normal)
Remission ⇒ condition not taking medications & sugar (normal) ⇒ elaboration chance◇ symptoms(yes)
OR Remission ⇒ contrast control(sugar(normal)) ⇒ elaboration symptoms(no)

600 elaboration (LeftToRight)
  explanation (LeftToRight) ◄── 602
  attribution (RightToLeft) ◄── 604
    TEXT:Bariatric Surgery helps
    manner-means (LeftToRight) ◄── 606
      TEXT:you lose weight
      enablement (LeftToRight) ◄── 608
        TEXT:by changing your stomach and digestive system
        attribution (RightToLeft) ◄── 610
          TEXT:to limit
          TEXT:how much you can eat .
  contrast (LeftToRight) ◄── 612
    same-unit
      elaboration (LeftToRight)
        TEXT:Aside from helping
        TEXT:you lose weight ,
      TEXT:it may help reverse diabetes in other ways ,
    TEXT:although scientists do not yet know exactly why .
  elaboration (LeftToRight)
    elaboration (LeftToRight)
      enablement (LeftToRight) ◄── 614
        TEXT:One theory is that it affects the hormones in your gut
        TEXT:to help your body control blood glucose .
      attribution (RightToLeft)
        TEXT:Researchers estimate
        cause
          TEXT:that upwards of three-quarters of people see their diabetes reversed
          TEXT:after bariatric surgery
    comparison ◄── 616
      TEXT:Gastric bypass and gastric sleeve surgery have better long-term results
      TEXT:than gastric banding.

Bariatric surgery ⇒^cause upwards of three-quarters of people◊ see their *diabetes(reversed)*
changing your stomach and digestive system ⇒^enablement to limit how much you can eat ⇒^manner-means lose weight
*diabetes(reversed)*⇒^contrast although scientists do not yet know exactly why
Gastric bypass and gastric sleeve surgery ⇒^comparison gastric banding
it [Bariatric surgery] affects the hormones in your gut ⇒^enablement to help your body *control(sugar(_))*.

FIG. 7

OBTAINING SUPPORTED DECISION TREES FROM TEXT FOR MEDICAL HEALTH APPLICATIONS

CROSS-REFERENCE TO RELATED APPLICATIONS

This non-provisional application claims priority to U.S. Patent Application No. 63/058,204, filed on Jul. 29, 2020, entitled "Obtaining Supported Decision Trees from Text for Medical Health Application," the disclosure of which is herein incorporated by reference in its entirety for all purposes.

TECHNICAL FIELD

This disclosure is generally concerned with linguistics. More specifically, this disclosure relates to using providing automated answers to questions using supported decision trees.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

BRIEF SUMMARY

Aspects of the present disclosure relate to classifying input data using a supported decision tree. The method may comprise accessing a corpus of documents associated with a subject. The method may further comprise generating a first discourse tree from a first document and a second discourse tree from a second document. In some embodiments, each discourse tree including a plurality of nodes where each nonterminal node represents a rhetorical relationship between at least two fragments of a corresponding document, and each terminal node of the nodes of the discourse tree is associated with one of the fragments. In some embodiments, the first and second documents are from the corpus of documents. The method may further comprise generating, by the one or more processors, a first plurality of decision chains from the first discourse tree and a second plurality of decision chains from the second discourse tree. In some embodiments, each decision chain may be a sequence of elements comprising a premise and a decision connected by rhetorical relationships. The elements of each supported decision tree may be identified from the plurality of nodes of the discourse trees. The method may further comprise generating, by the one or more processors, the supported decision tree based at least in part on the first and second plurality of decision chains. In some embodiments, the supported decision tree may have nodes that correspond to a feature of a decision and edges corresponding to a value of the feature, wherein the nodes of the supported decision tree are identified from the elements of the plurality of decision chains and ordered based at least in part on a set of predefined priority rules. The method may further comprise receiving the input data and classifying the input data based at least in part on traversing the supported decision tree (e.g., using the input data).

In some embodiments, the method may further comprise identifying a respective premise and corresponding decision from the first discourse tree based at least in part on the rhetorical relationships identified by the nodes of the first discourse tree and generating a decision chain to comprise the respective premise and corresponding decision. In some embodiments, generating the plurality of decision chains and the supported decision tree is performed as an offline process. The method may further comprise identifying, based at least in part on a predefined ontology, a common entity of two decision chains. In some embodiments, a first of the two decision chains is included in the first plurality of decision chains and a second of the two decision chains is included in the second plurality of decision chains. The method may further comprise merging the two decision chains to form a decision navigation graph. The decision navigation graph may comprise nodes representing each respective element of the two decision chains connected by edges representing the rhetorical relationships. In some embodiments, the two decision chains are merged based at least in part on the common entity. The method may further comprise ordering the nodes of the decision navigation graph to form a decision pre-tree, the decision pre-tree being a fragment of the supported decision tree, the ordering being performed in accordance with set of predefined priority rules. The method may further comprise ordering the nodes of the decision navigation graph to form a second decision pre-tree, the second decision pre-tree being a second fragment of the supported decision tree. The method may further comprise assigning linguistic information comprising an entity type, one or more entity attributes, and one or more rhetorical relationships to each node of the decision pre-tree and second decision pre-tree and merging the decision pre-tree and the second decision pre-tree to form the supported decision tree.

In at least one embodiment, a computing device is disclosed. The computing device may comprise a computer-readable medium storing non-transitory computer-executable program instructions and a processing device communicatively coupled to the computer-readable medium for executing the non-transitory computer-executable program instructions. In some embodiments, executing the non-transitory computer-executable program instructions with the processing device causes the computing device to perform the method disclosed above.

In at least one embodiment, a non-transitory computer-readable storage medium storing computer-executable program instructions for classifying input data using a supported decision tree is disclosed. In some embodiments, executing the program instructions by one or more processors of a computing device, cause the computing device to perform the method disclosed above.

BRIEF DESCRIPTION OF THE DRAWINGS

FIG. 4 is a block diagram depicting an example discourse tree, in accordance with at least one embodiment.

FIG. 5 is a block diagram depicting a set of formalizations of some of the entities identified by discourse tree of FIG. 4, in accordance with at least one embodiment.

FIG. 6 is a block diagram depicting another example discourse tree, in accordance with at least one embodiment.

FIG. 7 is a block diagram depicting a set of formalizations of some of the entities identified by discourse tree of FIG. 6, in accordance with at least one embodiment.

DETAILED DESCRIPTION

Figure 1:
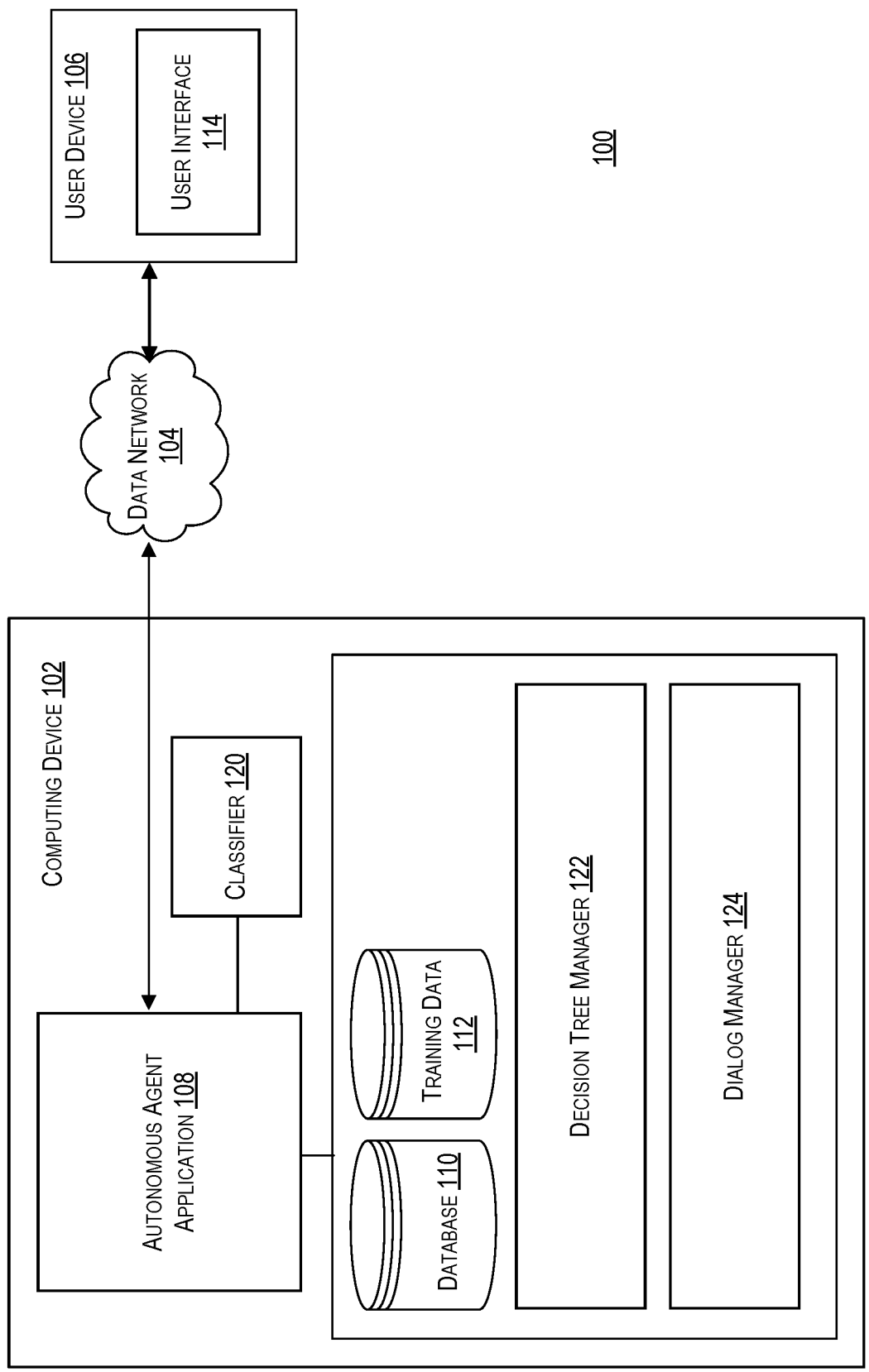
FIG. 1 depicts an example autonomous agent environment, in accordance with at least one embodiment.

Aspects of the present disclosure relate to generating supported decision trees from which input data may be classified or decisions may be determined based on input data. As a non-limiting example, automated answers (e.g., medical advice) for a user query (e.g., a medical question posed by a user) may be generated utilising supported decision trees.

In at least one embodiments, the techniques discussed herein relate to generating a supported decision tree that can be used to classify input data and/or for making decisions based on input data. By way of example, the techniques discussed herein can be utilized by a system to provide medical advice and/or diagnosis from user input. One reasons such a system is advantageous is that it mitigates a lack of human experts by enabling general specialists achieve a correct diagnosis with minimal time and effort. Furthermore, this system can act as an educational tool for newly graduated doctors, guiding their work with their patients and supporting their diagnostic decisions. As an example in which such supported decision trees can be used, an user interface may allow a user to enter the symptoms and findings and in turn presents the diagnostic output. It is often hard to determine the underlying diseases responsible for a known set of health problems, especially when the signs and symptoms are unclear. Additionally, there are few experts on certain diseases, especially in poor and developing countries. Systems like the one discussed herein could be especially helpful in these contexts. One advantage of the system discussed herein involves the transparency of the decisions identified by the model. These decisions can be easily understood based on the reasoning from which these decisions are derived. In the techniques discussed herein, knowledge is expressed by rules, often if/then rules. These rules can be newly developed or can be extracted from decision tables or decision trees.

Decision trees are examples of easily interpretable models whose predictive accuracy is normally low. In comparison, decision tree ensembles such as random forest exhibit high predictive accuracy while being regarded as black-box models. Decision trees often mimic the human level thinking so it is simple to understand the data and make some good interpretations. Decision trees allow a developer to see the logic for the data (unlike black box algorithms such as supervised machine learning or deep learning).

Once a collection of text has been obtained, a flow of potential recommendations may be provided to present a pathway to achieve a reader's goal. This recommendation flow can be extracted in the form of a discourse tree. Once a set of discourse trees is obtained, they can be combined to form a decision tree. Once this decision tree is available, it can be provided to a user via its visualization as a tree, a web form, or a dialogue, or in any suitable manner. Another option is to incorporate this decision tree into the system. In the latter example, this decision tree becomes a structure to perform a dialogue management navigating through this decision tree such that the questions to the user would provide choices for each node of this decision tree.

By way of example, a dialogue can be initiated by the user by submitting a question (e.g., "Can I recover from type 2 diabetes?"). The system, using a previously-generated decision tree, can navigate the decision tree posing additional questions to the user. The user can provide her answers which specify her parameters (e.g., diet changes, weight loss, remission, etc.). As the user provides answers to each of these parameters, the system leads the user to conclusions (e.g., Yes-Possible or No-impossible) by acquiring the decision tree from text (e.g., a corpus of documents related to type 2 diabetes). To acquire a structure of the decision tree, the system extracts elementary discourse units (EDUs) from the text to get parameters and rhetorical relations to establish a causal structure for these parameters: what causes of probably causes (with modalities) what.

Once a decision tree is formed from text, it can be refined with additional data (e.g., information indicating why a decision was made). In a regular decision tree, obtained from attribute data, only its structure and the values of thresholds retains the information about a decision knowledge domain. Naturally, if attributes are extracted from text and a decision tree is built from these attributes, some information from text is lost. However, the techniques discussed herein build a decision tree from text where an author expresses the motivations behind the decisions, provides explanations and argumentation, the decision becomes explainable in some cases. Some edges of a decision tree are associated with additional information for why the decision was made and thus, this additional information is part of the decision tree itself. This additional information is expressed via rhetorical relations for the respective decision chains, mental states, and actions of mentioned agents attached to these decisions and other semantic and discourse means. Enabling a conventional discourse tree with this additional information to make and back up decisions makes these decisions more accurate and personalized to the circumstances of a given subject. We refer to such enriched decision trees as supported decision tree, as the edges are supported by explanation, argument, rhetorical accent and other means.

A supported decision tree is designed to work in typical and also atypical, personalized cases as well. In a typical situation, the averaged optimal decision from decision tree is applied. If an system determined that a situation is atypical, and is presented via text, some decisions can be made by navigating a corresponding supported decision tree and some—by matching the linguistic cue of the case description with the ones attached to the supported decision tree's nodes. An atypical situation presented via attribute values without text is still handled by the decision tree.

A supported decision tree provides a unified decision framework for various cases of data availability. A supported decision tree can be constructed from a single document or from a number of documents or texts. If a database or a collection of texts from which attribute-values can be extracted is available, the supported decision tree will be refined. If only a database and no texts are available, the supported decision tree may be reduced to a decision tree. If a decision case is just a list of attribute-values, then the decision tree is applied, and if this case includes text, then the full-scale supported decision tree may be employed.

A supported decision tree built from text might not be optimal in terms of order of splitting by an attribute, but it reflect the text author's intuition concerning her experience with making decisions based on attributes mentioned in text. A decision tree built from attribute-value associations extracted from text is optimal in terms of which attributes are checked first, second and last, but they lack the background support for why a given decision is made. Decision trees may be well suited to decide on a attribute-value case but cannot accept a textual description of a case. Hence, supported decision trees are the best of both worlds, using attribute-value and semantic representations formed from text.

A regular decision tree for attributes $a_i \in A$ can be defined recursively: For each attribute a the system finds the feature that best divides the training data such as information gain from splitting on a. Let $a_{best}$ be the attribute with the highest normalized information gain. The system can form a decision node n that splits on $a_{best}$. To proceed, the system iterates through the sub-lists obtained by splitting on $a_{best}$ and add those nodes as children of node n.

To generate a supported decision tree, each edge of the regular decision tree can be labeled with information extracted from text for the given decision step. The information can include, one or more of: the extracted entity, 2) the extracted phrase for the attribute for this entity, 3) a rhetorical relation, and/or 4) the nucleus and/or satellite EDUs. For some decision making cases (e.g., an atypical decision-making case), an edge of the supported decision tree can be obtained by matching aspects from user input.

To generate a decision tree, a corpus of documents of a given subject are accessed. From these texts, multiple discourse trees can be generated (e.g., one discourse tree from one text and a second discourse tree from another text of the corpus). Each discourse tree can include a plurality of nodes. Each nonterminal node of a discourse tree represents a rhetorical relationship between at least two fragments of a corresponding document, and each terminal node of a discourse tree may be associated with one of the fragments.

A number of decision chains can be generated from the first discourse tree. The decision chain may include a sequence of elements that includes a premise and a decision connected by rhetorical relationships. In some embodiments, the elements are identified from the plurality of nodes of a discourse tree. A decision chain is a generalization of an if/then statement, an implication, a causal link that can lead a reader to a decision, given a premise. This generalization follows along the line of rhetorical relations between the premise part and a decision part in discourse analysis of text.

A decision tree fragment (e.g., a portion of a supported decision tree) can be generated using the decision chains. The decision tree may have nodes that correspond to a feature of a decision and edges corresponding to a value of the feature. In some embodiments, the nodes of the decision tree are identified from the elements of the previously discussed decision chains and ordered based at least in part on a set of predefined priority rules. In some embodiments, decision chains can be extracted from the texts on a given topic and then combined with individual decisions extracted from those texts to form a decision tree.

A decision tree is a tree structure representation of the given decision problem such that each non-leaf node is associated with one of the decision variables, each branch from a non-leaf node is associated with a subset of the values of the corresponding decision variable, and each leaf node is associated with a value of the target (or dependent) variable. For a classification tree, the target variable takes its values from a discrete domain, and for each leaf node the decision tree associates a probability (and in some cases a value) for each class (i.e. value of the target variable). The class that is assigned to a given leaf node of the classification tree results from a form of majority voting in which the winning class is the one that provides the largest class probability even if that probability is less than a half.

Although examples herein may relate to providing dialog management, it should be appreciate that the supported decision trees discussed herein may be used in a wide variety of contexts outside of dialog management, in any suitable situation that includes a need to classify input data. Thus, in any suitable situation in which conventional decision trees are used, the supported decision trees discussed herein may be utilized to achieve various improvements (e.g., such as enhanced explainability over conventional decision trees for the ultimate decisions made).

Turning now to the figures, FIG. 1 depicts autonomous agent environment 100, in accordance with at least one embodiment.

FIG. 1 depicts computing device 102, data network 104, and user device 106. The computing device 102 may further include database 110 and training data 112. User device 106 may include user interface 114. Training data 112 may be utilized to train classifier 120 to identify answers from corresponding queries (e.g., natural language queries also referred to as "questions") provided at user interface 114.

User device 106 can be any mobile device such as a mobile phone, smart phone, tablet, laptop, smart watch, and the like. User device 106 communicates via data network 104 to computing device 102. Data network 104 can be any public or private network, wired or wireless network, Wide Area Network, Local Area Network, or the Internet.

The classifier 120 may be previously trained by the computing device 102 and/or any suitable system to identify output data from input data. The classifier 120 may include one or more predictive models, classification models, neural networks, and so on. In some embodiments, classifier 120 may be trained utilizing any suitable supervised learning algorithm in which a function (sometimes referred to as "a model") is trained to identify output (e.g., an answer) from provided input (e.g., a natural language query) based at least in part on a training data set including input/output pairs (e.g., other input data previously paired with corresponding output decisions). The classifier 120 can be utilized in any suitable context to provide any suitable decision from input data. In some embodiments, the autonomous agent application 108 may be configured to train the classifier 120 from training data 112 (e.g., a number of example question (input) and answer (output) pairs), or the autonomous agent application 108 may obtain the (already trained) classifier 120 from memory or another system. In some embodiments, the output (e.g., an answer) provided by the classifier 120 may include a decision log which includes the specific factors (e.g., specific user data) which influenced the decision of which answer to provide. In some embodiments, the output may be stored in database 110 and/or the input utilized by the classifier 120 and the corresponding output provided by the classifier 120 may be stored as additional training data within training data 112. In an example, the database 110 may include a corpus of documents (e.g., documents corresponding various diseases, illnesses, and/or conditions).

The computing device 102 may include a decision tree manager 122. The decision tree manager 122 may be configured to generate one or more decision trees (e.g., decision trees, supported decision trees, etc.) from the corpus of documents within database 110. In some embodiments the decision tree manager 122 may utilize the techniques discussed herein in connection with FIGS. 2-11 to generate these decision trees which may then be stored in database 110 for subsequent use.

Database 110 may include a domain ontology that includes information such as terminology, entities, and so forth about a particular domain (e.g., subject). In some cases, an autonomous agent can be domain-specific. Examples of domains include medical, finance, business, engineering, and so forth.

The dialog manager 124 may be configured to determine responses to user input (e.g., one or more user queries). The dialog manager 124 may utilize the user input (e.g., a natural language query) to identify a previously-generated decision tree from database 110. The dialog manager 124 may traverse the decision tree in order to identify one or more questions to pose the user in order to obtain additional input. The dialog manager 124 may utilize the user's original query and/or one or more subsequent inputs to the questions posed to the user to further traverse the decision tree in order to identify a final response to the user's query. The response(s) may be provided by the autonomous agent application 108 to the user interface 114 via data network 104.

Figure 2:
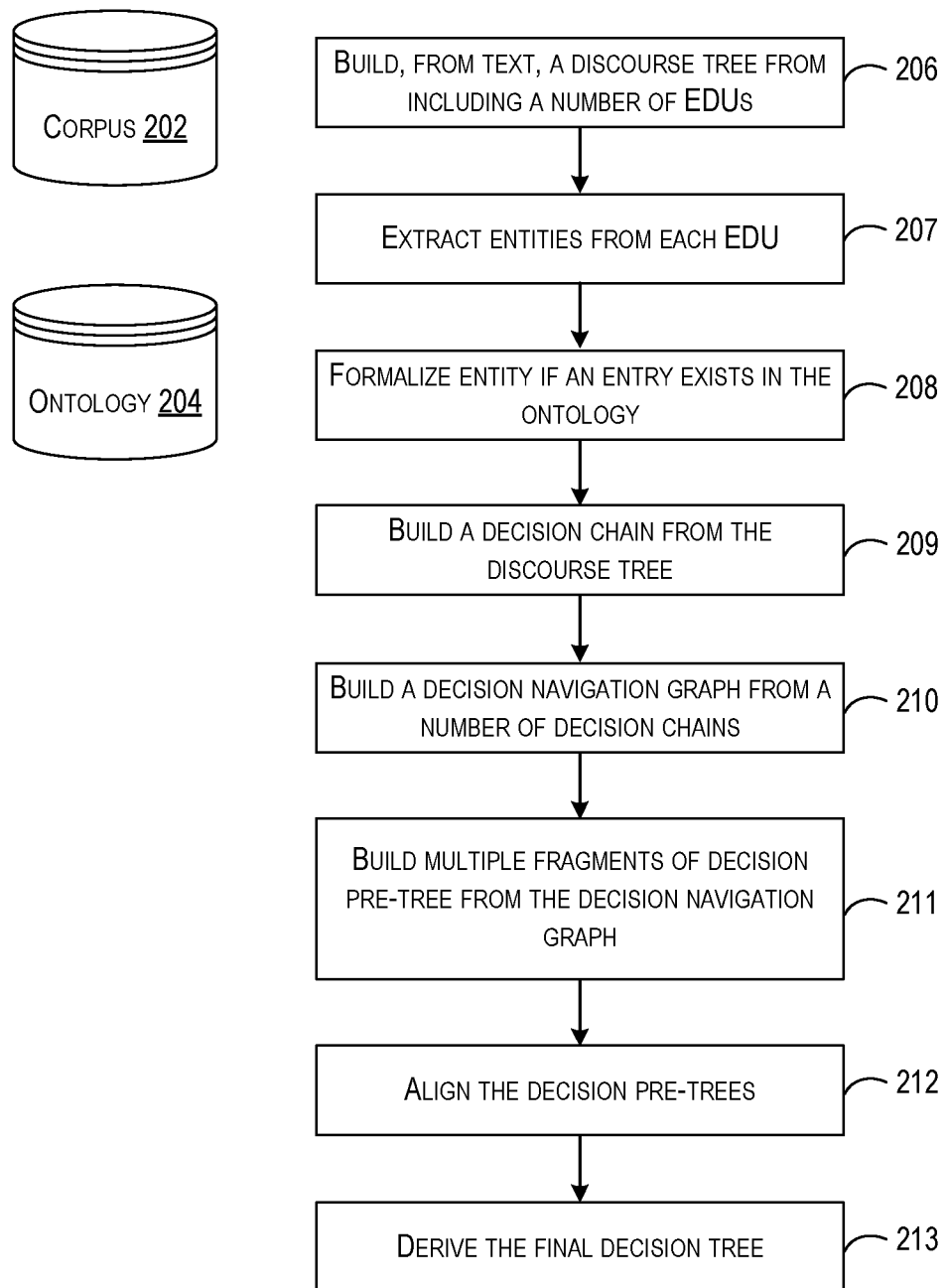
FIG. 2 is a block diagram depicting an example method for deriving a decision tree, in accordance with at least one embodiment.

FIG. 2 is a block diagram depicting a method 200 for deriving a decision tree, in accordance with at least one embodiment. The method 200 may be performed by the decision tree manager 122 of FIG. 1, or by any suitable computing device (e.g., computing device 102, or another computing device separate from the computing device 102 of FIG. 1).

As used herein, "textual unit" refers to a unit of text. Examples include an elementary discourse unit, phrase, fragment, sentence, paragraph, page, and document.

As used herein, "entity" refers to something with a distinct and independent existence. An entity may be used in a textual unit. Examples of entities include a person, a company, a location, a thing, a name of a document, or a date or time.

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence, paragraphs, and the like. A discourse tree may include any suitable number of nodes in a tree structure. Each nonterminal node represents a rhetorical relationship between at least two fragments and each terminal node of the nodes of the discourse tree is associated with one of the fragments.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "index" is a table, data structure, pointer, or other mechanism that links two keywords, data, or parts of text. An index can include searchable content. Examples of an index include an inverse index, a searchable index, and a string match. An inverse index is also searchable.

The operations of method 200 may be performed in any suitable order. Although a particular number of operations are depicted in FIG. 2, it should be appreciated that additional operations may be added or any suitable number of the operations depicted in FIG. 2 may be removed in other methods for deriving a decision tree.

Corpus 202 may include any suitable number of documents and/or texts associated with a variety of topics (e.g., medical diseases, illnesses, conditions, symptoms, etc.) in a given domain (e.g., medical). Ontology 204 may include information such as terminology, entities, and so forth about a particular domain (e.g., subject) such as the medical field. Examples of domains include medical, finance, business, engineering, and so forth.

Figure 3:
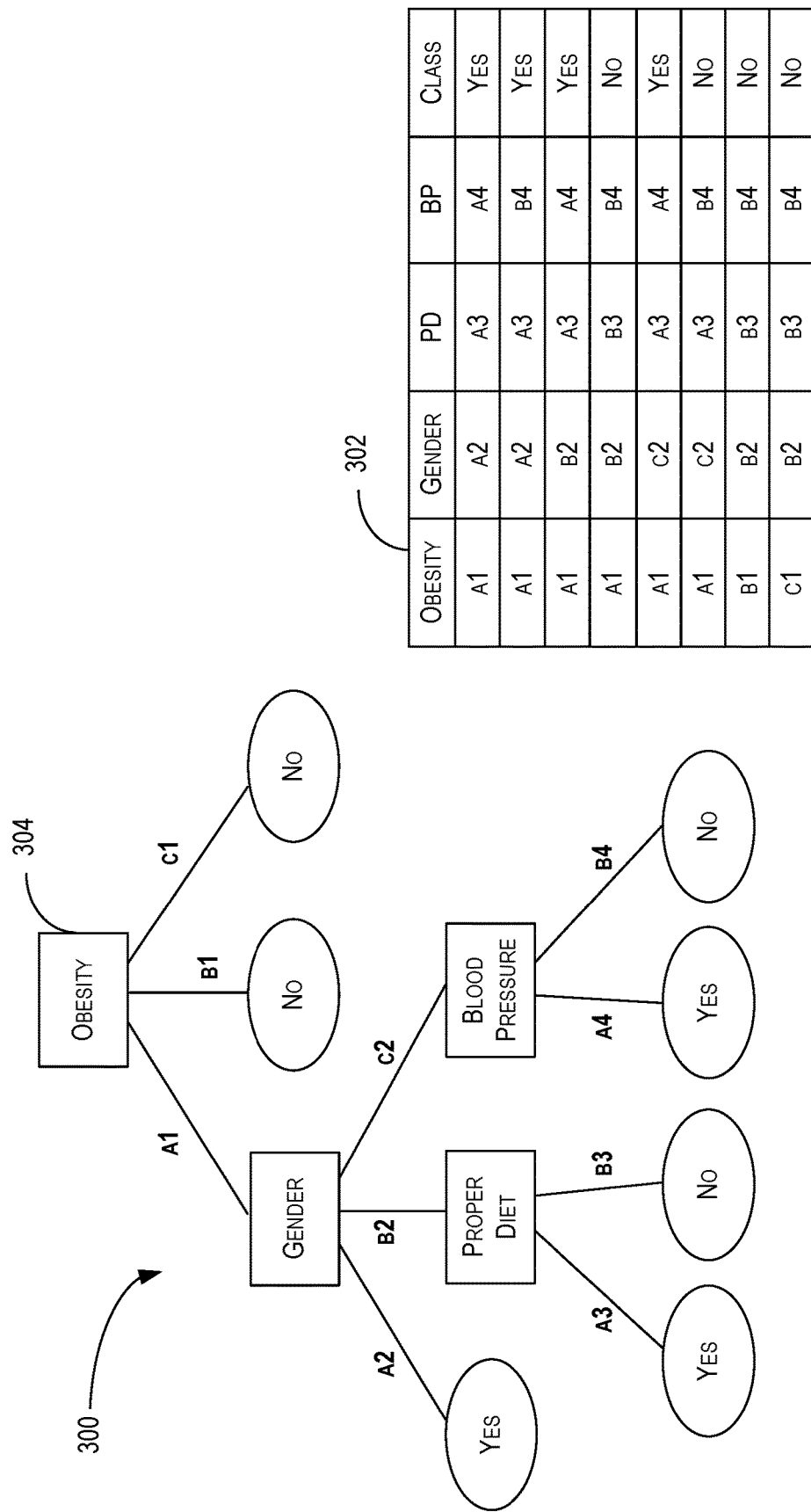
FIG. 3 is a block diagram depicting an example decision tree, in accordance with at least one embodiment.

FIG. 3 is a block diagram depicting an example decision tree 300, in accordance with at least one embodiment. A decision tree defines a model by a series of questions that lead to an outcome (e.g., represented by a leaf node of the decision tree). Each nonterminal node of the decision tree relates to a specific parameter/variable. The decision tree represents a protocol in a series of "if this occurs then this occurs" conditions that collectively produce a specific result. Decision trees can be generated from a corpus of documents (e.g., the corpus 202 of FIG. 2). Decision trees where the target variables (e.g., variables represented by nonterminal nodes) use a discrete set of values can be referred to as classification trees. In these trees, each node, or leaf, represents class labels while the branches represent conjunctions of features leading to the class label. Decision trees are trees that classify instances by sorting them based on feature values. Each node in a decision tree represents a feature in an instance to be classified, and each edge represents a value that the node can assume. Instances are classified starting at the root node and sorted based on their feature values.

Decision tree 300 is an example of one decision tree. In the example depicted, decision tree 300 relates to determining whether a person is considered obese. Using the decision tree 300 as an example, the instance ⟨obesity=a1, gender=b2, proper diet=a3, blood pressure=b4⟩ would sort to the nodes: obesity, gender, proper diet and blood pressure which would classify this instance as being Yes. The table 302 depicts various tree paths and their corresponding classification (e.g., Yes or No).

The feature that best divides the training data would be the root node of the tree (e.g., root node 304, obesity). There are numerous methods for finding the feature that best divides the training data such as information gain and Gini index. These metrics measure the quality of a split. In the context of training a decision tree, entropy can be roughly thought of as how much variance the data has. It is measures for C classes as:

$$E = -\sum_{i}^{C} p_i \log_2 p_i$$

where $p_i$ is the probability of randomly picking an element of class i (i.e. the proportion of the dataset made up of class i). At the same time, Gini Impurity is calculated as:

$$G = \sum_{i=1}^{C} p(i) * (1 - p(i))$$

A Gini Impurity of 0 is the lowest and best possible impurity. It can only be achieved when everything is the same class. The same procedure is then repeated on each partition of the divided data, creating sub-trees until the training data is divided into subsets of the same class The algorithm for building a decision tree (e.g., the decision tree 300) can be expressed by the following:
1) compute the entropy for a data-set
2) for every attribute/feature:
   a) calculate entropy for all categorical values
   b) take average information entropy for the current attribute
   c) calculate gain for the current attribute
3) pick the highest gain attribute
4) repeat until the desired tree is generated Through the few decades, decision trees have been broadly used both to represent and to facilitate decision processes. Decision trees can be automatically induced from attribute-value and relational databases using supervised learning algorithms which usually aim at minimizing the size of the tree. When inducing decision trees in a medical setting, the induction process is expected to involve the background knowledge used by health-care professionals in the form of medical ontology. Physicians rely on this knowledge to form decision trees that are medically and clinically comprehensible and correct.

Comprehensibility measures the medical coherence of the sequence of questions represented in the tree, and correctness rates for how much irrelevant are the errors of the decision tree from a medical or clinical point of view. Some algorithms partially solve these problems pursuing alternative objectives such as reducing the economic cost or improving the adherence of the decision process to medical standards. However, from a clinical point of view, none of these criteria is valid when it is considered alone, because real medical decisions are taken considering a combination of them, and also other health-care criteria, simultaneously. Moreover, this combination of criteria is not static and may vary if the decision tree is made for different purposes as screening, diagnosing, providing a prognosis, or determining a drug and/or therapy prescription. In some embodiments, the disclosed techniques utilize a decision tree induction algorithm (e.g., an example of the method 200 of FIG. 2) that uses combinations of healthcare criteria expressed in text, and relies on the generated decision trees for screening and diagnosing. The mechanisms to formalize and to combine these criteria are also presented.

In the context of medical diagnosis, the disclosed decision trees can control a series of processes that a physician goes through to move a patient from diagnosis to cure. There are different methods to build a decision tree. One requirement may include dividing features to be as small as possible. The greedy "divide and conquer" principle is applied here: the most helpful attribute is tested first. This way, the problem is divided into smaller sub-problems, which are solved recursively. The first attribute becomes the root node of the tree (e.g., obesity). Each node $N_i$ of the tree is associated to an attribute from the input vector (e.g., gender, proper diet, and blood pressure). The branches of a node are labeled with the possible values of that attribute.

In developing a decision, the medical analysis can be broken down into a series of events. Some of those events are chance events. That is, a physician performs a treatment and it may or may not work, or works with some probability. That is a chance node. There are certain decision nodes for events where the physician needs to make a decision. In chance nodes, particularly, in areas of cancer treatment, where the physician might have a very complicated protocol with sophisticated decision trees, there is a high number of chance nodes and decision nodes. Decision nodes might involve questions like, "Shall I use this particular combination of treatments?", "I use it for 4 days or for a week?" etc.

Returning to FIG. 2, the method 200 for generating a decision tree may begin at 206, where a discourse tree including a number of EDUs is built from text. For example, the text may include one or more documents from the corpus 202. As a non-limiting example, each document from the corpus 202 may be parsed to generate a discourse tree for each sentence, paragraph, document, etc.

By way of example, a discourse tree may be generated for a first text:
"Although there is no cure for type 2 diabetes, studies show it is possible for some people to reverse it. Through diet changes and weight loss, you may be able to reach and hold normal blood sugar levels without medication. This does not mean you are completely cured Type 2 diabetes is an ongoing disease. Even if you are in remission, which means you are not taking medication and your blood sugar levels stay in a healthy range, there is always a chance, that symptoms will return. But it is possible for some people to go years without trouble controlling their glucose and the health concerns that come with diabetes."

FIG. 4 is a block diagram depicting an example discourse tree 400, in accordance with at least one embodiment. In some embodiments, the example discourse tree 400 is generated based on the first text provided above using Rhetoric Structure Theory (RST).

By way of background, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

As discussed, aspects described herein use rhetorical relations and discourse trees. Rhetorical relations can be described in different ways. For example, Mann and Thompson describe twenty-three possible relations. Other numbers of relations are possible. Table 1 below lists a number of exemplary rhetorical relations. The set of rhetorical relations may include more or fewer rhetorical relations and not necessarily the exact list provided in table 2.

TABLE 1

| Relation Name | Nucleus | Satellite |
|---|---|---|
| Antithesis | ideas favored by the author | ideas disfavored by the author |
| Attribution | text expressing an event or idea | text providing a source attributed for detailing the event or idea |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Contrast | text expressing an action or situation | text expressing the opposite action or situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Explanation | a situation | information intended to explain the cause of the situation |
| Interpretation | a situation | an interpretation of the situation |
| Joint | a first situation | a second situation that occurs at the same time as the first situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |

TABLE 1-continued

| Relation Name | Nucleus | Satellite |
|---|---|---|
| Purpose | an intended situation | the intent behind the situation |
| Restatement | a situation | a re-expression of the situation |
| Same Unit | a first statement | a second statement that is the equivalent of the first statement |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Discourse trees originate from Rhetorical Structure Theory (RST). RST models a logical organization of text employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences.

The leaves of a discourse tree correspond to EDUs, the contiguous atomic text spans. Adjacent EDUs are connected by coherence relations (e.g., attribution, sequence), forming higher-level discourse units. The leaves of a particular EDU are logically related. This relationship is referred to as the coherence structure of the text. Example relations include elaboration and enablement. As used herein, "nuclearity" refers to which text segment, fragment, or span, is more central to a writer's purpose. A "nucleus" refers to a span of text that is more central to a writer's purpose than a "satellite," which is less central to a writer's purpose.

Using RST, the paragraph above may be parsed and the discourse tree 400 generated.

Returning to FIG. 2, the method 200 may proceed to 207, where various entities may be extracted from each EDU of the discourse tree 400. In some embodiments, these entities may be compared to various entities provided in ontology 204. The ontology 204 may include concepts, relations, instances, and axioms. A concept may represent a set of class of entities (e.g., things) within a domain (e.g., medical diagnosis). The ontology 204 may provide a vocabulary of terms within the domain and some description of the terms meaning. Some additional information within the ontology 204 may include how various concepts/terms are inter related which collectively impose a structure on the domain and constrain the possible interpretations of terms.

Concepts can include primitive concepts and defined concepts. Primitive concepts may include those which only have necessary conditions (in terms of their properties) for membership of the class. For example, a globular protein is a kind of protein with a hydrophobic core, so all globular proteins must have a hydrophobic core, but there could be other things that have a hydrophobic core that are not globular proteins. Defined concepts are those whose description is both necessary and sufficient for a thing to be a member of the class. For example, eukaryotic cells are kinds of cells that have a nucleus. Not only does every eukaryotic cell have a nucleus, every nucleus containing cell is eukaryotic.

Relations describe interactions between concepts or concept's properties. For example, taxonomies, a type of relation, organize concepts into sub/super concept tree structure. For example, some relationships describe that an entity "is a kind of" other entity. For example, type 2 diabetes is a kind of diabetes. Another relationship may descript concepts that are a part of other concepts, such as a human being "has a component" such as a heart. The ontology 204 may further include associative relationship that relate concepts across tree structures such as relationships that describe the names of concepts (e.g., gene hasName geneName), locative relationship describe the location of one concept with respect to another (e.g., chomosome has SubcellularLocation nucleus), associative relationships that represent functions and/or processes the concept has or is involved in (e.g., insulin pump isAssociatedWithProcess insulin therapy), and the like.

Instances may include things that are represented by a concept (e.g., a cytochrome is an instance of the concept protein). Axioms may be used to constrain values for classes or instances. One can think of properties of a relation as a kind of axiom. Axioms can include more general rules.

In some embodiments, the ontology 204 can represent domain knowledge in the form of labeled graphs, whose nodes represent entities or concepts, whereas edges represent semantic relationships between these concepts. In some embodiments, the ontology 204 can express entities and/or concepts in a formal language.

At 208, entities identified in the discourse trees generated at 206 may be identified and compared to the ontology 204. If an entity is found within the ontology 204, the entity may be formalized (e.g., expressed in a formal language).

FIG. 5 depicts a set of formalizations 500 of some of the entities identified by discourse tree 400 of FIG. 4.

When a text is represented as a discourse tree, it is split into elementary discourse units (EDUs), denoted by 'TEXT:' tag. EDUs are organized hierarchically according to rhetorical relations between them. For an arbitrary rhetorical relation, and in particular, relation of Elaboration, <satellite> elaborates (provides additional information) on <nucleus>. Certain rhetorical relations have an obvious interpretations in terms of what decision <satellite> can be made by means of <nucleus>. In some embodiments, a predefined rule set may be utilized to identify a set of rhetorical relations from a discourse tree 400 of FIG. 4. As a non-limiting example, the rhetorical relations 402-418 of FIG. 4 may be identified based on one such rule set. FIG. 5 presents a number of formalizations derived from the rhetorical relations 402-418 identified from the discourse tree 400 based on the ontology 204 of FIG. 2. By way of example, sugar(normal) may be a formal representation of target values. The representations chance ◊, possibility ◊ may individually be used as a modality which does not change the configuration of a supported decision tree but access the chance of navigation of the given decision chain.

FIG. 6 is a block diagram depicting another example discourse tree 600, in accordance with at least one embodiment.

Similar to the process described above in connection with FIG. 4, RST may be used to generate the discourse tree 600 by parsing the paragraph:

"Bariatric surgery helps you lose weight by changing your stomach and digestive system to limit how much you can eat. Aside from helping you lose weight, it may help reverse diabetes in other ways, although scientists don't yet know exactly why. One theory is that it affects the hormones in your gut to help your body control blood glucose. Researchers estimate that upwards of three-quarters of people see their diabetes reversed after bariatric surgery. Gastric bypass and gastric sleeve surgery have better long-term results than gastric banding."

Various entities may be identified from the discourse tree 600 and compared to the ontology 204 of FIG. 2. If an entity is found within the ontology 204, the entity may be formalized (e.g., expressed in a formal language). In some embodiments, a predefined rule set may be utilized to identify a set of rhetorical relations from a discourse tree 600 of FIG. 6. As a non-limiting example, the rhetorical relations 602-616 of FIG. 6 may be identified based on one such rule set. FIG. 5 presents a number of formalizations derived from the rhetorical relations 402-418 identified from the discourse tree 400 based on the ontology 204 of FIG. 2.

FIG. 7 depicts a set of formalizations 700 of some of the entities identified by discourse tree 600 of FIG. 6. For example, FIG. 7 presents a number of formalizations derived from the rhetorical relations 602-616 identified from the discourse tree 600 based on the ontology 204 of FIG. 2.

It should be appreciated that the operations described at 206-208 of FIG. 2 may be performed any suitable number of times for every sentence, paragraph, document (or any suitable form of granularity) of corpus 202 of FIG. 2. FIGS. 3-7 depict these operations performed on two paragraphs of the corpus 202, but these operations can be performed any suitable number of times.

Returning to FIG. 2, at 209, a decision chain may be built from the discourse tree. A decision chain may include a sequence of EDUs with rhetorical relations between sequence elements. Each element of a decision chain is a whole original EDU (or its representation as a logic form) that can be obtained as a result of a semantic parsing (depending whether an entity from this EDU occurs in an available ontology or not). For decision chains, it is useful to split the text into shorter EDUs so that each contains a single entity, if possible. Also, it is crucial to identify rhetorical relations associated with decision making, such as Cause, Attribution, Explanation, Enablement, Means, and others non-default relations. Building a discourse tree is followed by extracting entities from the obtained EDUs. Entity extraction and semantic parsing is supported by a domain-specific ontology. For formalized elements of decision chains, it is easier to establish a correspondence or synonymy between entities to form a decision navigation graph. Elements of a decision chain are connected with $\Rightarrow^{rhetorical\_relation}$ between a premise and a decision. It can be read as "If <premise> then make <decision> according to rhetorical_relation". In a decision chain, each consecutive member starting from the second one is a <decision>. Each previous member is a premise.

Figure 8:
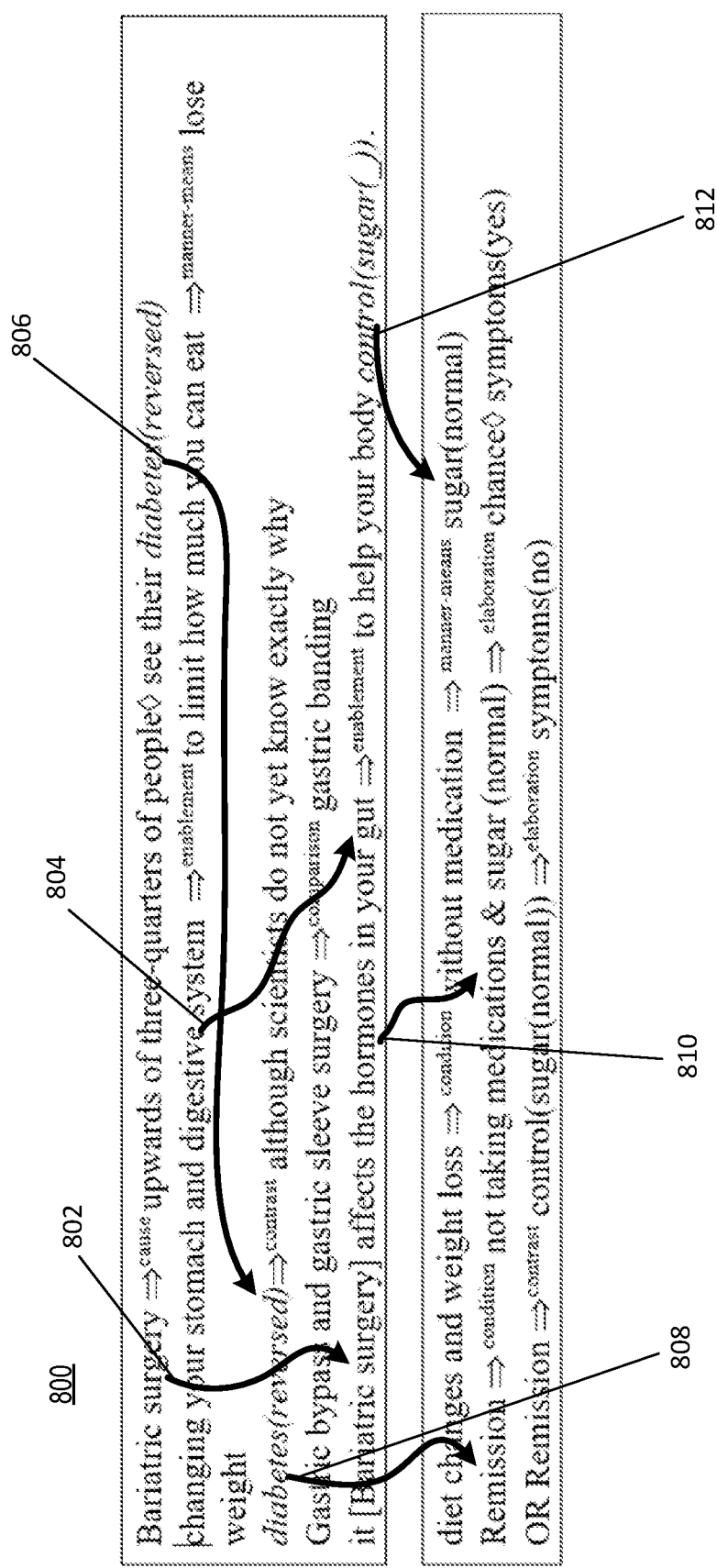
FIG. 8 is a block diagram depicting an example decision chain extracted from two texts (e.g., the two texts described in connection with FIGS. 4 and 6), in accordance with at least one embodiment.

FIG. 8 is a block diagram 800 depicting a number of example decision chains extracted from two texts (e.g., the two texts described above in connection with FIGS. 4 and 6), in accordance with at least one embodiment.

In some embodiments, similar entities can be identified from within the two texts. The arrows (e.g., arrows 802-812) depicted in FIG. 8 are intended to depict associations between the same (or corresponding) entities, possibly, parameterized differently, such as control(sugar(_))→sugar (normal)). In the first formalized decision expression control (sugar(_)), the outermost predicate is control( ) that ranges over control subjects such as sugar(_) with an anonymized variable "_". These similarities can be identified using the decision chains of FIGS. 4 and 6 in conjunction with the ontology 204 of FIG. 2. The entities (and the respective EDUs they occur in) in the decision chains may be considered to be corresponding, if they are: 1) formalized and can be successfully unified as logic forms; or 2) not formalized, but form a common sub-parse tree which constitutes an entity.

Returning to FIG. 2, at 210, a decision navigation graph may be built from a number of decision chains (e.g., the decision chains depicted in FIG. 8). By way of example, graph-based transformation and label assignment may be applied to the decision chains to generate the decision navigation graph of FIG. 9.

Figure 9:
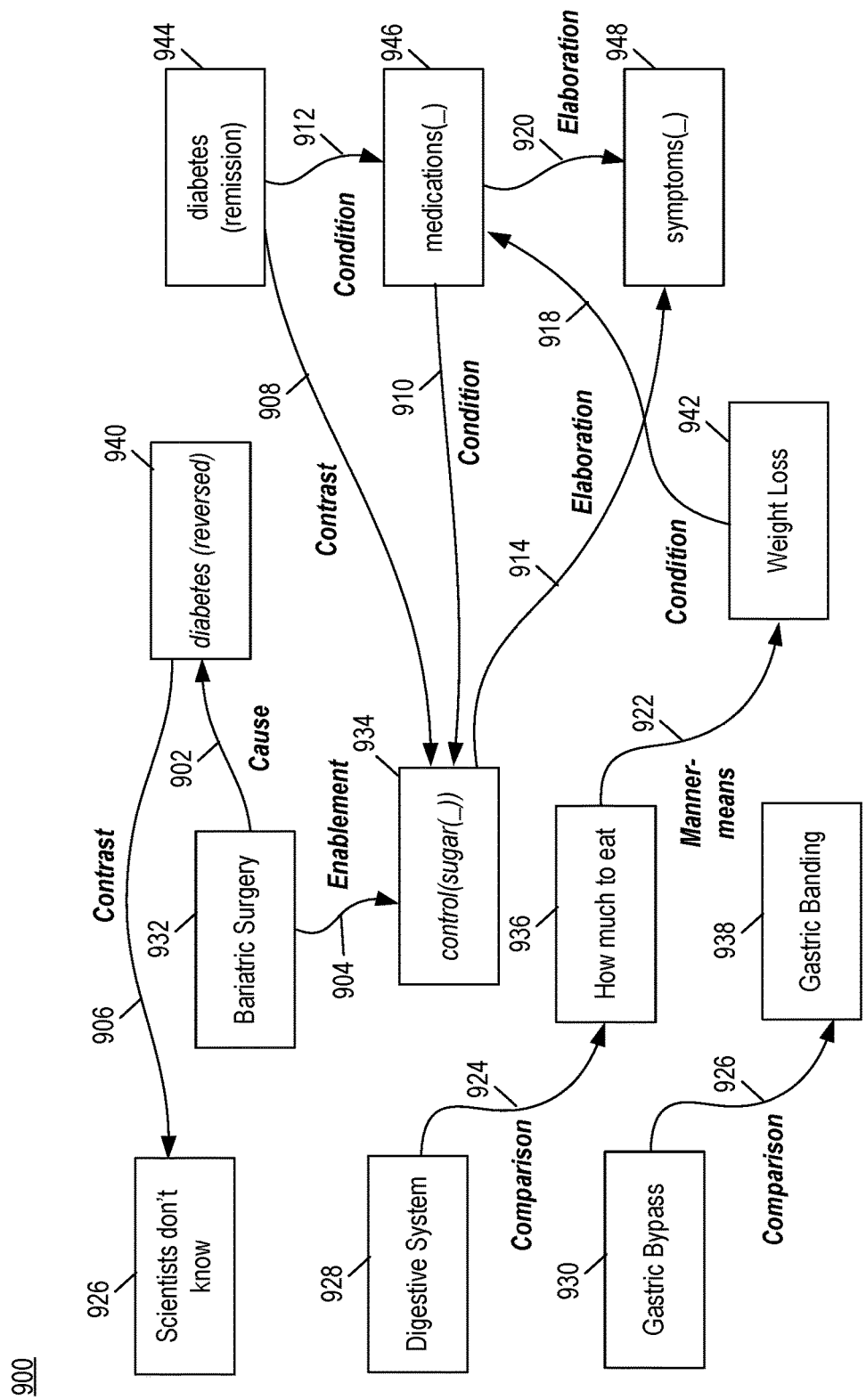
FIG. 9 depicts an example decision navigation graph, an intermediate representation between a discourse tree and a support decision tree, in accordance with at least one embodiment.

FIG. 9 depicts an exemplary decision navigation graph 900, an intermediate representation between a discourse tree and a support decision tree fragment, in accordance with at least one embodiment. To build a decision navigation graph (e.g., the decision navigation graph 900), the nodes of the decision chains (e.g., the decision chains depicted in FIG. 8) with the corresponding entities are merged. The arcs between the nodes of foreign decision chains are removed as the merge occurs but rhetorical relations in the chains are retained. In the decision navigation graph, $\Rightarrow^{contrast}$ are turned into associations (e.g., associations depicted by the arrows of FIG. 9. By way of example, the two decision chains:

Bariatric surgery $\Rightarrow^{cause}$ upwards of three-quarters of people ◇ see their diabetes(reversed)
and
it [Bariatric surgery] affects the hormones in your gut $\Rightarrow^{enablement}$ to help your body control(sugar(_)).
may be merged based at least in part on identifying the common entity bariatric surgery. Thus, rhetorical relations represented by edges 902-924 of the decision navigation graph 900 are intended to depict rhetorical relations identified from the two decision chains above. In the decision navigation graph 900, each entity is represented once by the nodes 926-948. In the decision navigation graph 900, all nodes have the same "importance."

Returning to FIG. 2, at 211, multiple fragments of a decision pre-tree may be generated from a decision navigation graph (e.g., the decision navigation graph 900 of FIG. 9, built at 210).

Figure 10:
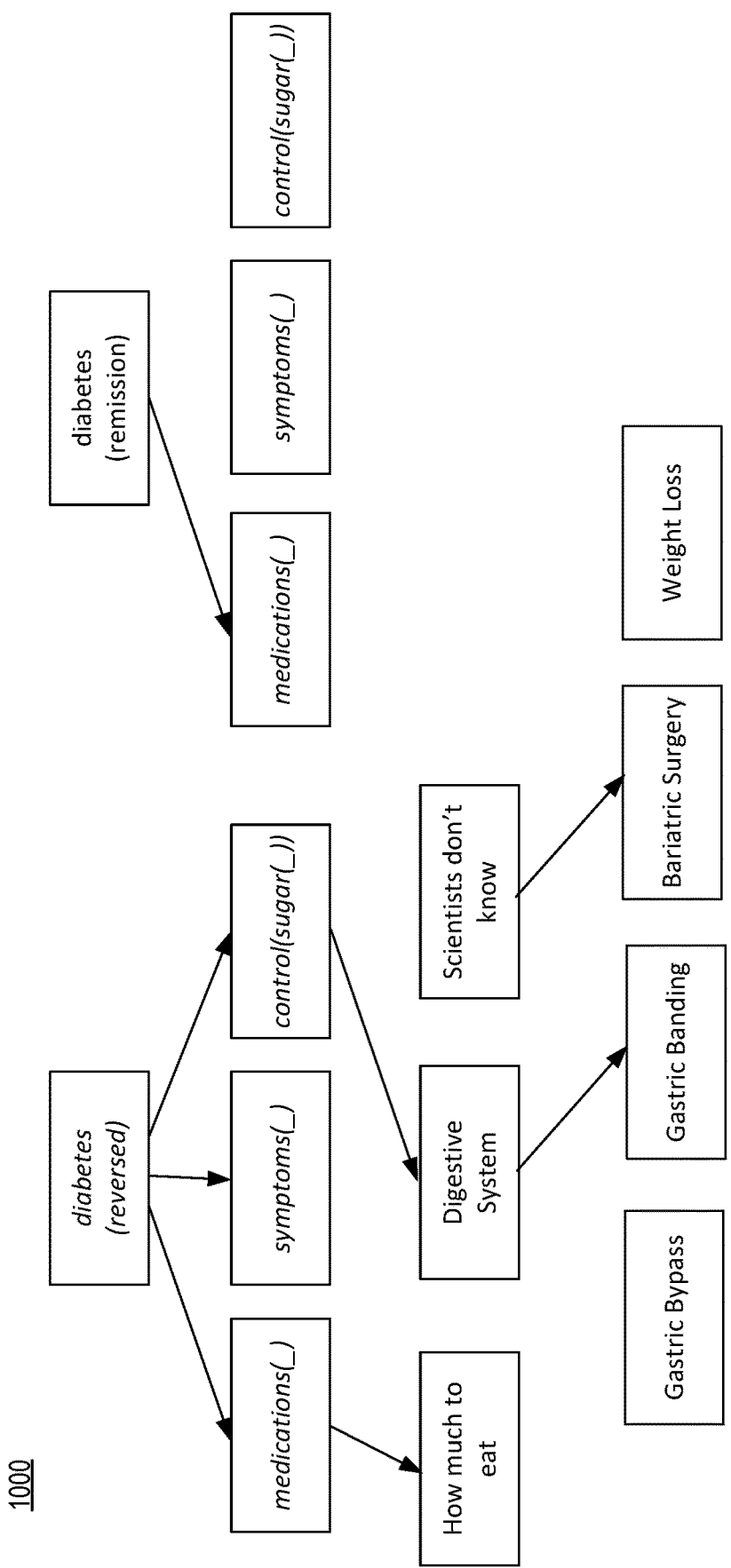
FIG. 10 depicts a fragment of a example decision pre-tree generated from the decision navigation graph of FIG. 9, in accordance with at least one embodiment.

FIG. 10 depicts a fragment 1000 of a decision pre-tree generated from the decision navigation graph 900 of FIG. 9, in accordance with at least one embodiment. In some embodiments, the fragment 1000 may correspond to a particular text (e.g., the text discussed above in connection with FIGS. 6 and 7). In some embodiments, the nodes corresponding to the text within the decision navigation graph 900 may be ordered according to their respective importance to form a decision pre-tree. Nodes for the same entities can be split if it is helpful for further decision classes. The relative importance of nodes can be determined based at least in part on the following considerations: 1) from the discourse trees which form the decision navigation graph 900 and/or 2) from the auxiliary data of the attribute-value format, according to the classical algorithms of decision tree formation. Each node can be labeled with linguistic information extracted from each EDU such as sentiment, argumentation, explanation chain, and rhetorical relation. It should be noted that the decision pre-tree 1000 is not a complete tree in the sense that some nodes and edges are missing: they are expected to be obtained either from other texts, or from attribute-value data. Thus, the fragment 1000 may be generated from the elements of the decision navigation graph 900 that correspond to the text discussed above in connection with FIG. 6. Another fragment (not depicted) may be generated from the elements of the decision navigation graph 900 that correspond to the text discussed above in connection with FIG. 4. Each node of each fragment may be assign linguistic information such as entity type, entity attributes, rhetorical relations, etc.

Returning to FIG. 2, at 11, the multiple fragments of the decision pre-tree may be may be aligned. To align multiple fragments, common entities/nodes can be identified between fragments.

At 213, the final decision tree (e.g., a supported decision tree) may be derived. The common entities/nodes of each fragment may be merged to form a single decision tree (e.g., the complete decision tree 1100).

Figure 11:
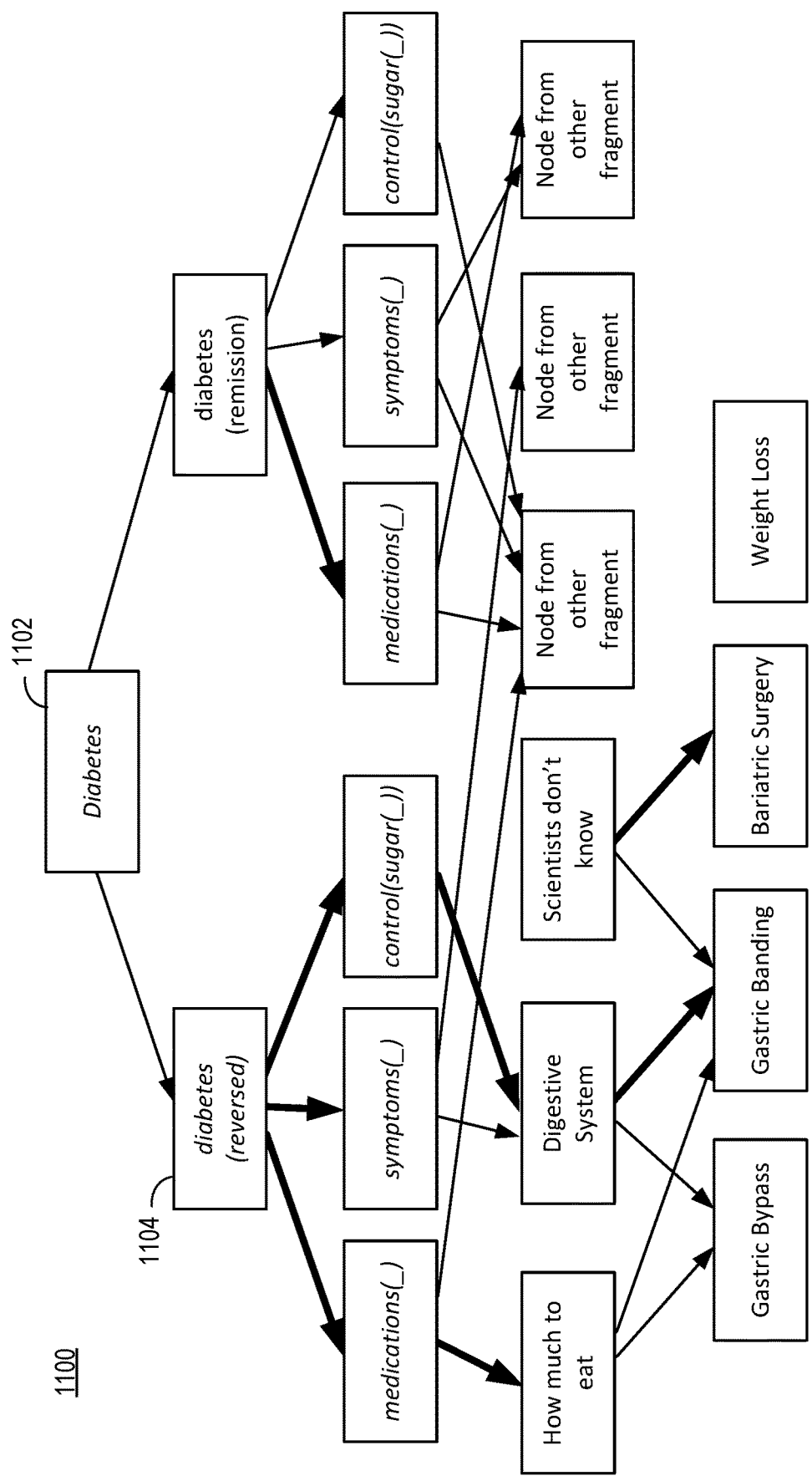
FIG. 11 depicts a complete decision tree generated from one or more decision pre-trees, in accordance with at least one embodiment.

FIG. 11 depicts a complete decision tree 1100 (e.g., an example of a supported decision tree) generated from one or more decision pre-trees (e.g., decision pre-tree 1000 representing one fragment of the decision navigation graph 900 of FIG. 9), in accordance with at least one embodiment.

Fragments of a decision pre-tree may be converted/merged to form the complete decision tree 1100. In at least one embodiment, the decision pre-tree may be populated with an attribute-value dataset, updating the threshold values but not the tree structure. The motivation here is that the decision logic from text is more helpful than data point counts. If such dataset is not available, the system can utilize the decision pre-tree and finalize the complete decision tree 1100 after some trial-and-error iterations with real-domain decision logs. To avoid duplication of nodes in the resultant complete decision tree, common nodes can be aggregated/merged. A complete decision tree (e.g., the complete decision tree 1100) may contain as many choice nodes as possible given the available data, so it considered complete in the sense that all information from the text (e.g., the two paragraphs described above in connection with FIGS. 4 and 6) is attempted to be used to form decision nodes. Potentially, from more text or more attribute-value data a super-tree of the constructed supported decision tree could be built. In some examples, an apex (e.g., node 1102) of the complete decision tree 1100 can be associated with a subject (e.g., diabetes) of the two paragraphs described above. In some embodiments, the subject can be identified based at least in part on a predefined rule set and the discourse trees identified in connection with FIGS. 4 and 6.

Figure 12:
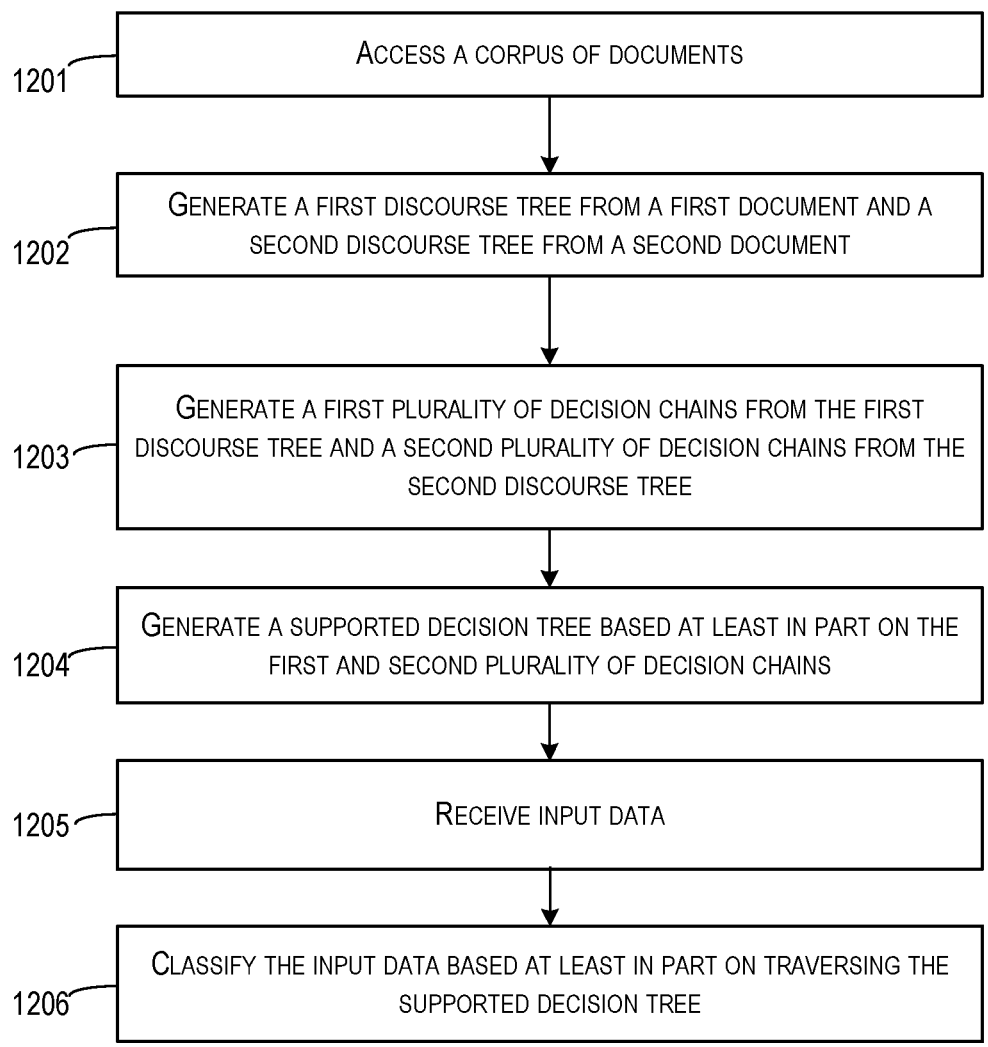
FIG. 12 depicts a flowchart illustrating an example of a method for providing a response to a user query using a decision tree, in accordance with at least one embodiment.

FIG. 12 depicts a flowchart illustrating another example of a method 1200 for classifying input data utilizing a supported decision tree, in accordance with at least one embodiment. In some embodiments, the method 1200 may be performed by the autonomous agent application 108 of FIG. 1 although the method 1200 may be performed in other contexts outside of dialog management.

The method 1200 may begin at 1201, where a corpus of documents associated with a subject can be accessed. By way of example, the corpus of documents can represent any suitable number of texts of a particular domain. Corpus 202 of FIG. 2, a corpus of medical texts, is an example of a corpus of documents that represents information from a medical domain.

At 1202, a first discourse tree (e.g., discourse tree 400 of FIG. 4) can be generated from a first document (e.g., the first example paragraph described above in connection with FIG. 4) and a second discourse tree (e.g., discourse tree 600 of FIG. 6) can be generated from a second document (e.g., the second example paragraph described above, whether it be in the same or different document as the first example paragraph). In some embodiments, each discourse tree includes a plurality of nodes, where each nonterminal node representing a rhetorical relationship between at least two fragments of a corresponding document, and each terminal node of the nodes of the discourse tree being associated with one of the fragments. In some embodiments, the first and second documents are from the corpus of documents.

At 1203, a first plurality of decision chains (e.g., the decision chains 500 of FIG. 5) can be generated from the first discourse tree (e.g., discourse tree 400 of FIG. 4) and a second plurality of decision chains e.g., the decision chains 700 of FIG. 7) can be generated from the second discourse tree (e.g., discourse tree 600 of FIG. 6). In some embodiments, each decision chain is a sequence of elements comprising a premise and a decision connected by rhetorical relationships. The elements can be identified from the plurality of nodes of the discourse trees.

At 1204, the supported decision tree (e.g., the supported decision tree 1100 of FIG. 11, an example of a supported decision tree) can be generated based at least in part on the first and second plurality of decision chains. In some embodiments, the decision tree may have nodes that (individually) correspond to a feature of a decision and edges corresponding to a value of the feature. In some embodiments, the nodes of the decision tree are identified from the elements of the plurality of decision chains and ordered based at least in part on a set of predefined priority rules. In some embodiments, the supported decision tree 1100 may be generated based on performing the operations discussed at 210-213 of FIG. 2.

At 1205, input data is received. In one embodiments, the input can be in the form of natural language (e.g., "can I reverse my type 2 diabetes?"). In some embodiments, the input data can be parsed to identify EDUs. One or more EDUs may be analyzed to identify a subject/classification (e.g., diabetes) from the input data. The subject/classification of the input data may be used to identify a supported decision tree (e.g., the complete decision tree 1100 of FIG. 1) based at least in part on matching the subject/classification of the input to an apex node (e.g., node 1102) or other label associated with the supported decision tree.

At 1206, the input data may be classified based at least in part on utilizing the supported decision tree. For example, the input data may be utilized to make traversal decisions at each node of the supported decision tree until a leaf node is reached. The leaf node may correspond to a particular classification. As a non-limiting example, the input data may be a user query (e.g., "can I reverse my type 2 diabetes?") a response to the user query is provided based at least in part on traversing the decision tree. By way of example, the dialog manager 124 of FIG. 1, may traverse the decision tree to pose a series of questions to the user. For example, a given node (e.g., node 1104 of FIG. 11) may be identified based on matching at least one EDU of the user query (e.g., diabetes reversed). The dialog manager 124 may then traverse the complete decision tree 1100 according to a predefined set of rules to identify a response such as "yes, if you limit how much you eat to lose weight, you can reverse your type 2 diabetes. Many people see their diabetes reversed after bariatric surgery (or other methods such as gastric bypass, gastric sleeve surgery, or gastric banding). This may be due to the fact that bariatric surgery helps you lose weight by changing your stomach and digestive system to limit how much you can eat."

Figure 13:
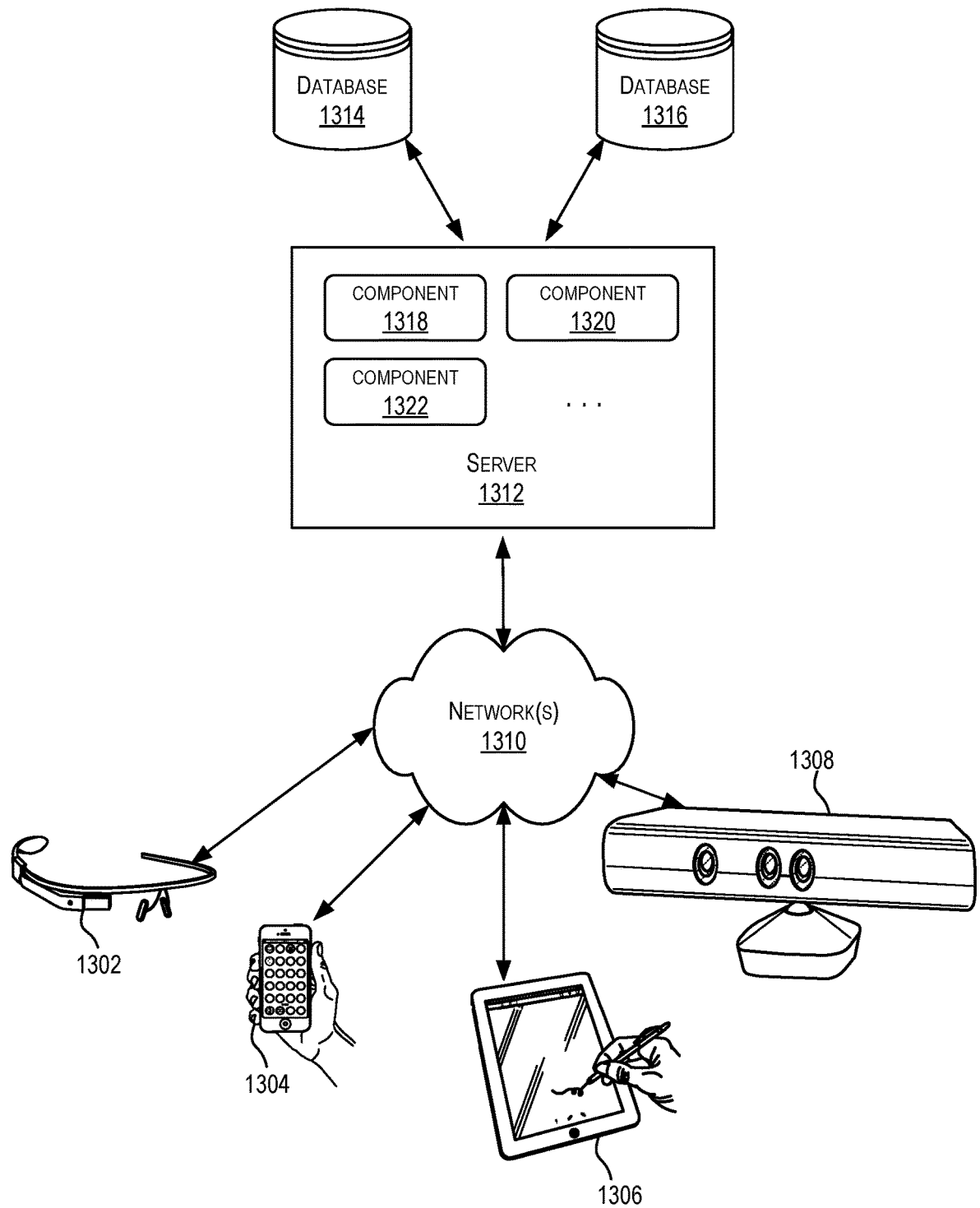
FIG. 13 depicts a simplified diagram of a distributed system for implementing one of the aspects.

FIG. 13 depicts a simplified diagram of a distributed system 1300 for implementing one of the aspects. In the illustrated aspect, distributed system 1300 includes one or more client computing devices 1302, 1304, 1306, and 1308, which are configured to execute and operate a client application such as a web browser, proprietary client (e.g., Oracle Forms), or the like over one or more network(s) 1310. Server 1312 may be communicatively coupled with remote client computing devices 1302, 1304, 1306, and 1308 via network(s) 1310.

In various aspects, server 1312 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in the figure, the software components 1318, 1320 and 1322 of system 1300 are shown as being implemented on server 1312. In other aspects, one or more of the components of system 1300 and/or the services provided by these components may also be implemented by one or more of the client computing devices 1302, 1304, 1306, and/or 1308. Users operating the client computing devices may then utilize one or more client applications to use the services provided by these components. These components may be implemented in hardware, firmware, software, or combinations thereof. It should be appreciated that various different system configurations are possible, which may be different from distributed system 1300. The aspect shown in the figure is thus one example of a distributed system for implementing an aspect system and is not intended to be limiting.

Client computing devices 1302, 1304, 1306, and/or 1308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1302, 1304, 1306, and 1308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1310.

Although exemplary distributed system 1300 is shown with four client computing devices, any number of client computing devices may be supported. Other devices, such as devices with sensors, etc., may interact with server 1312.

Network(s) 1310 in distributed system 1300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1310 can be a local area network (LAN), such as one based on Ethernet, Token-Ring and/or the like. Network(s) 1310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.6 suite of protocols, Bluetooth®, and/or any other wireless protocol); and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1312 can include one or more virtual machines running virtual operating systems, or other computing architectures involving virtualization. One or more flexible pools of logical storage devices can be virtualized to maintain virtual storage devices for the server. Virtual networks can be controlled by server 1312 using software defined networking. In various aspects, server 1312 may be adapted to run one or more services or software applications described in the foregoing disclosure. For example, server 1312 may correspond to a server for performing processing described above in accordance with an aspect of the present disclosure.

Server 1312 may run an operating system including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more databases 1314 and 1316. Databases 1314 and 1316 may reside in a variety of locations. By way of example, one or more of databases 1314 and 1316 may reside on a non-transitory storage medium local to (and/or resident in) server 1312. Alternatively, databases 1314 and 1316 may be remote from server 1312 and in communication with server 1312 via a network-based or dedicated connection. In one set of aspects, databases 1314 and 1316 may reside in a storage-area network (SAN). Similarly, any necessary files for performing the functions attributed to server 1312 may be stored locally on server 1312 and/or remotely, as appropriate. In one set of aspects, databases 1314 and 1316 may include relational databases, such as databases provided by Oracle, that are adapted to store, update, and retrieve data in response to SQL-formatted commands.

Figure 14:
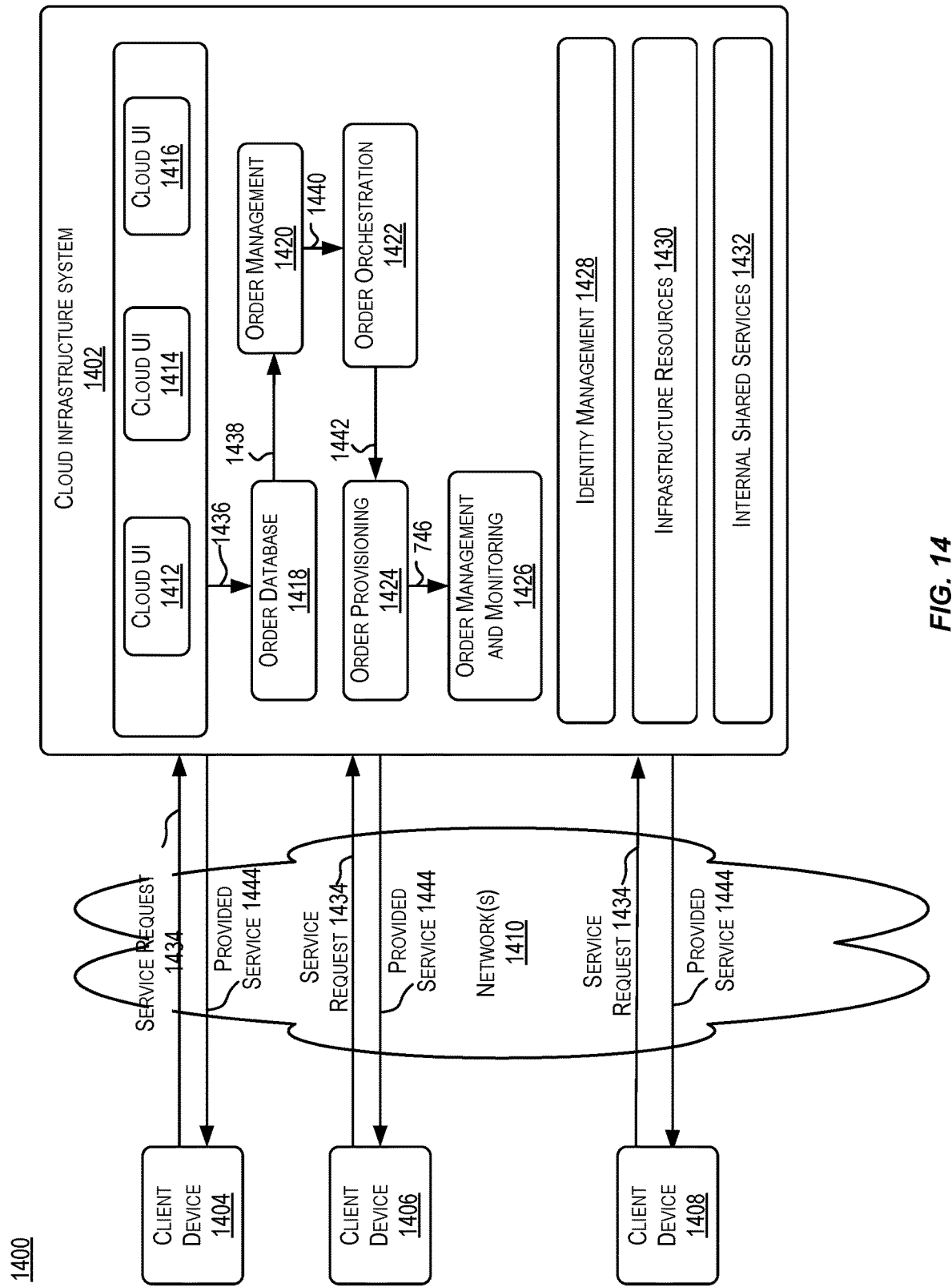
FIG. 14 is a simplified block diagram of components of a system environment by which services provided by the components of an aspect system may be offered as cloud services in accordance with an aspect.

FIG. 14 is a simplified block diagram of one or more components of a system environment 1400 (e.g., a cloud infrastructure system) by which services provided by one or more components of an aspect system may be offered as cloud services, in accordance with an aspect of the present disclosure. In the illustrated aspect, system environment 1400 includes one or more client computing devices 1404, 1406, and 1408 that may be used by users to interact with a cloud infrastructure system 1402 that provides cloud services. The client computing devices may be configured to operate a client application such as a web browser, a proprietary client application (e.g., Oracle Forms), or some other application, which may be used by a user of the client computing device to interact with cloud infrastructure system 1402 to use services provided by cloud infrastructure system 1402.

It should be appreciated that cloud infrastructure system 1402 depicted in the figure may have other components than those depicted. Further, the aspect shown in the figure is only one example of a cloud infrastructure system that may incorporate an aspect of the invention. In some other aspects, cloud infrastructure system 1402 may have more or fewer components than shown in the figure, may combine two or more components, or may have a different configuration or arrangement of components.

Client computing devices 1404, 1406, and 1408 may be devices similar to those described above for 1302, 1304, 1306, and 1308 of FIG. 13.

Although exemplary system environment 1400 is shown with three client computing devices, any number of client computing devices may be supported. Other devices such as devices with sensors, etc. may interact with cloud infrastructure system 1402.

Network(s) 1410 may facilitate communications and exchange of data between client computing devices 1404, 1406, and 1408 and cloud infrastructure system 1402. Each network may be any type of network familiar to those skilled in the art that can support data communications using any of a variety of commercially-available protocols, including those described above for network(s) 1410.

Cloud infrastructure system 1402 may comprise one or more computers and/or servers that may include those described above for server 1312 of FIG. 13.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise in accordance with a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1402 may be adapted to automatically provision, manage and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some aspects, the services provided by cloud infrastructure system 1402 may include one or more services provided under a Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some aspects, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1402 may also include infrastructure resources 1430 for providing the resources used to provide various services to customers of the cloud infrastructure system. In one aspect, infrastructure resources 1430 may include pre-integrated and optimized combinations of hardware, such as servers, storage, and networking resources to execute the services provided by the PaaS platform and the SaaS platform.

In some aspects, resources in cloud infrastructure system 1402 may be shared by multiple users and dynamically re-allocated per demand. Additionally, resources may be allocated to users in different time zones. For example, cloud infrastructure system 1402 may enable a first set of users in a first time zone to utilize resources of the cloud infrastructure system for a specified number of hours and then enable the re-allocation of the same resources to another set of users located in a different time zone, thereby maximizing the utilisation of resources.

In certain aspects, a number of internal shared services 1432 may be provided that are shared by different components or modules of cloud infrastructure system 1402 and by the services provided by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1402 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1402, and the like.

In one aspect, as depicted in the figure, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In exemplary operation 1434, a customer using a client device, such as client computing devices 1404, 1406 or 1408, may interact with cloud infrastructure system 1402 by requesting one or more services provided by cloud infrastructure system 1402 and placing an order for a subscription for one or more services offered by cloud infrastructure system 1402. In certain aspects, the customer may access a cloud User Interface (UI), cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 in which the customer intends to subscribe.

After an order has been placed by the customer, the order information is received via the cloud UIs, 1412, 1414 and/or 1416.

At operation 1436, the order is stored in order database 1418. Order database 1418 can be one of several databases operated by cloud infrastructure system 1402 and operated in conjunction with other system elements.

At operation 1438, the order information is forwarded to an order management module 1420. In some instances, order management module 1420 may be configured to perform billing and accounting functions related to the order, such as verifying the order, and upon verification, booking the order.

At operation 1440, information regarding the order is communicated to an order orchestration module 1422. Order orchestration module 1422 may utilize the order information to orchestrate the provisioning of services and resources for the order placed by the customer. In some instances, order orchestration module 1422 may orchestrate the provisioning of resources to support the subscribed services using the services of order provisioning module 1424.

In certain aspects, order orchestration module 1422 enables the management of business processes associated with each order and applies business logic to determine whether an order should proceed to provisioning. At operation 1442, upon receiving an order for a new subscription, order orchestration module 1422 sends a request to order provisioning module 1424 to allocate resources and configure those resources needed to fulfill the subscription order. Order provisioning module 1424 enables the allocation of resources for the services ordered by the customer. Order provisioning module 1424 provides a level of abstraction between the cloud services provided by system environment 1400 and the physical implementation layer that is used to provision the resources for providing the requested services. Order orchestration module 1422 may thus be isolated from implementation details, such as whether or not services and resources are actually provisioned on the fly or pre-provisioned and only allocated/assigned upon request.

At operation 1444, once the services and resources are provisioned, a notification of the provided service may be sent to customers on client computing devices 1404, 1406 and/or 1408 by order provisioning module 1424 of cloud infrastructure system 1402.

At operation 1446, the customer's subscription order may be managed and tracked by an order management and monitoring module 1426. In some instances, order management and monitoring module 1426 may be configured to collect usage statistics for the services in the subscription order, such as the amount of storage used, the amount data transferred, the number of users, and the amount of system up time and system down time.

In certain aspects, system environment 1400 may include an identity management module 1428. Identity management module 1428 may be configured to provide identity services, such as access management and authorization services in system environment 1400. In some aspects, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.). Identity management module 1428 may also include the management of descriptive information about each customer and about how and by whom that descriptive information can be accessed and modified.

Figure 15:
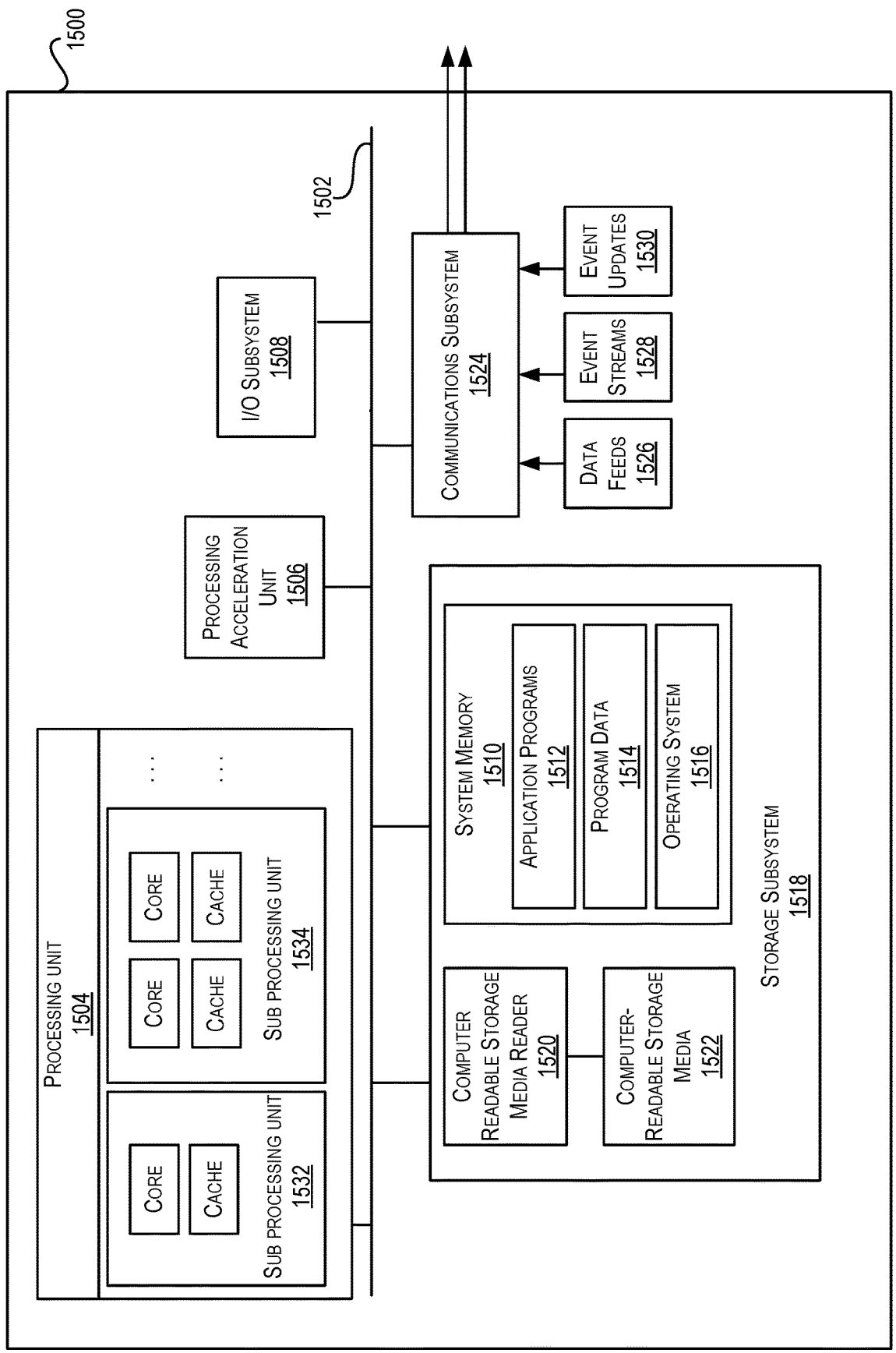
FIG. 15 illustrates an exemplary computer system, in which various aspects may be implemented.

FIG. 15 illustrates an exemplary computer system 1500, in which various aspects may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative aspects of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P886.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain aspects, processing unit 1504 may be implemented as one or more independent processing units 1532 and/or 1534 with single or multicore processors included in each processing unit. In other aspects, processing unit 1504 may also be implemented as a quad-core processing unit formed by integrating two dual-core processors into a single chip.

In various aspects, processing unit 1504 can execute a variety of programs in response to program code and can maintain multiple concurrently executing programs or processes. At any given time, some or all of the program code to be executed can be resident in processing unit 1504 and/or in storage subsystem 1518. Through suitable programming, processing unit 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1518 may also provide a tangible computer-readable storage medium for storing the basic programming and data constructs that provide the functionality of some aspects. Software (programs, code modules, instructions) that when executed by a processor provide the functionality described above, may be stored in storage subsystem 1518. These software modules or instructions may be executed by processing unit 1504. Storage subsystem 1518 may also provide a repository for storing data used in accordance with the present invention.

Storage subsystem 1518 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some aspects, communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1524 can provide wired network connectivity (e.g., Ethernet) in addition to or instead of a wireless interface.

In some aspects, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive unstructured data feeds 1526 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various attributes and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for classifying input data using a supported decision tree, comprising:
   accessing a corpus of documents associated with a subject;
   generating a first discourse tree from a first document and a second discourse tree from a second document, each discourse tree including a plurality of nodes, each nonterminal node representing a rhetorical relationship between at least two fragments of a corresponding document, and each terminal node of the nodes of the discourse tree being associated with one of the fragments, the first and second documents from the corpus of documents;
   generating, by the one or more processors, a first plurality of decision chains from the first discourse tree and a second plurality of decision chains from the second discourse tree, each decision chain being a sequence of elements comprising a premise and a decision connected by rhetorical relationships, the elements being identified from the plurality of nodes of the discourse trees;
   generating, by the one or more processors, the supported decision tree based at least in part on the first and second plurality of decision chains, the supported decision tree having nodes that correspond to a feature of a respective decision and edges corresponding to a value of the feature, wherein the nodes of the supported decision tree are identified from the elements of the first and second plurality of decision chains and ordered based at least in part on a set of predefined priority rules;
   receiving the input data; and
   classifying the input data based at least in part on traversing the supported decision tree using the input data.

2. The method of claim 1, wherein generating the first and second plurality of decision chains and the supported decision tree is performed as an offline process.

3. The method of claim 1, further comprising:
   identifying a respective premise and corresponding decision from the first discourse tree based at least in part on respective rhetorical relationships identified by the nodes of the first discourse tree; and
   generating a decision chain to comprise the respective premise and the corresponding decision.

4. The method of claim 1, further comprising:
   identifying, based at least in part on a predefined ontology, a common entity of two decision chains, wherein a first of the two decision chains is included in the first plurality of decision chains and a second of the two decision chains is included in the second plurality of decision chains; and
   merging the two decision chains to form a decision navigation graph, the two decision chains being merged based at least in part on the common entity, the decision navigation graph comprising respective nodes representing each respective element of the two decision chains connected by edges representing corresponding rhetorical relationships.

5. The method of claim 4, further comprising ordering the respective nodes of the decision navigation graph to form a decision pre-tree, the decision pre-tree being a fragment of the supported decision tree, the ordering being performed in accordance with set of predefined priority rules.

6. The method of claim 5, further comprising ordering the respective nodes of the decision navigation graph to form a second decision pre-tree, the second decision pre-tree being a second fragment of the supported decision tree.

7. The method of claim 6, further comprising:
   assigning linguistic information comprising an entity type, one or more entity attributes, and one or more rhetorical relationships to each node of the decision pre-tree and the second decision pre-tree; and
   merging the decision pre-tree and the second decision pre-tree to form the supported decision tree.

8. A computing device, comprising:
   one or more processors; and
   one or more memories storing computer-readable instructions for classifying input data using a supported decision tree, that, when executed by the one or more processors, cause the computing device to perform operations comprising:
   accessing a corpus of documents associated with a subject;
   generating a first discourse tree from a first document and a second discourse tree from a second document, each discourse tree including a plurality of nodes, each nonterminal node representing a rhetorical relationship between at least two fragments of a corresponding document, and each terminal node of the nodes of the discourse tree being associated with one of the fragments, the first and second documents from the corpus of documents;
   generating, by the one or more processors, a first plurality of decision chains from the first discourse tree and a second plurality of decision chains from the second discourse tree, each decision chain being a sequence of elements comprising a premise and a decision connected by rhetorical relationships, the elements being identified from the plurality of nodes of the discourse trees;
   generating, by the one or more processors, the supported decision tree based at least in part on the first and second plurality of decision chains, the supported decision tree having nodes that correspond to a feature of a respective decision and edges corresponding to a value of the feature, wherein the nodes of the supported decision tree are identified from the elements of the first and second plurality of decision chains and ordered based at least in part on a set of predefined priority rules;
   receiving the input data; and
   classifying the input data based at least in part on traversing the supported decision tree using the input data.

9. The computing device of claim 8, wherein generating the first and second plurality of decision chains and the supported decision tree is performed as an offline process.

10. The computing device of claim 8, wherein executing the instructions by the one or more processors, further causes the computing device to perform operations comprising:
    identifying a respective premise and corresponding decision from the first discourse tree based at least in part on respective rhetorical relationships identified by the nodes of the first discourse tree; and generating a decision chain to comprise the respective premise and the corresponding decision.

11. The computing device of claim 8, wherein executing the instructions by the one or more processors, further causes the computing device to perform operations comprising:
identifying, based at least in part on a predefined ontology, a common entity of two decision chains, wherein a first of the two decision chains is included in the first plurality of decision chains and a second of the two decision chains is included in the second plurality of decision chains; and
merging the two decision chains to form a decision navigation graph, the two decision chains being merged based at least in part on the common entity, the decision navigation graph comprising respective nodes representing each respective element of the two decision chains connected by edges representing corresponding rhetorical relationships.

12. The computing device of claim 11, wherein executing the instructions by the one or more processors, further causes the computing device to perform operations comprising ordering the respective nodes of the decision navigation graph to form a decision pre-tree, the decision pre-tree being a fragment of the supported decision tree, the ordering being performed in accordance with set of predefined priority rules.

13. The computing device of claim 12, wherein executing the instructions by the one or more processors, further causes the computing device to perform operations comprising ordering the respective nodes of the decision navigation graph to form a second decision pre-tree, the second decision pre-tree being a second fragment of the supported decision tree.

14. The computing device of claim 13, wherein executing the instructions by the one or more processors, further causes the computing device to perform operations comprising:
assigning linguistic information comprising an entity type, one or more entity attributes, and one or more rhetorical relationships to each node of the decision pre-tree and the second decision pre-tree; and
merging the decision pre-tree and the second decision pre-tree to form the supported decision tree.

15. A non-transitory computer-readable storage medium comprising computer-readable instructions for classifying input data using a supported decision tree, that, when executed by one or more processors of a computing device, cause the computing device to perform operations comprising:
accessing a corpus of documents associated with a subject;
generating a first discourse tree from a first document and a second discourse tree from a second document, each discourse tree including a plurality of nodes, each nonterminal node representing a rhetorical relationship between at least two fragments of a corresponding document, and each terminal node of the nodes of the discourse tree being associated with one of the fragments, the first and second documents from the corpus of documents;
generating, by the one or more processors, a first plurality of decision chains from the first discourse tree and a second plurality of decision chains from the second discourse tree, each decision chain being a sequence of elements comprising a premise and a decision connected by rhetorical relationships, the elements being identified from the plurality of nodes of the discourse trees;
generating, by the one or more processors, the supported decision tree based at least in part on the first and second plurality of decision chains, the supported decision tree having nodes that correspond to a feature of a respective decision and edges corresponding to a value of the feature, wherein the nodes of the supported decision tree are identified from the elements of the first and second plurality of decision chains and ordered based at least in part on a set of predefined priority rules;
receiving the input data; and
classifying the input data based at least in part on traversing the supported decision tree using the input data.

16. The non-transitory computer-readable storage medium of claim 15, wherein executing the instructions by the one or more processors, further causes the computing device to perform operations comprising:
identifying a respective premise and corresponding decision from the first discourse tree based at least in part on respective rhetorical relationships identified by the nodes of the first discourse tree; and
generating a decision chain to comprise the respective premise and the corresponding decision.

17. The non-transitory computer-readable storage medium of claim 15, wherein executing the instructions by the one or more processors, further causes the computing device to perform operations comprising:
identifying, based at least in part on a predefined ontology, a common entity of two decision chains, wherein a first of the two decision chains is included in the first plurality of decision chains and a second of the two decision chains is included in the second plurality of decision chains; and
merging the two decision chains to form a decision navigation graph, the two decision chains being merged based at least in part on the common entity, the decision navigation graph comprising respective nodes representing each respective element of the two decision chains connected by edges representing corresponding rhetorical relationships.

18. The non-transitory computer-readable storage medium of claim 17, wherein executing the instructions by the one or more processors, further causes the computing device to perform operations comprising ordering the respective nodes of the decision navigation graph to form a decision pre-tree, the decision pre-tree being a fragment of the supported decision tree, the ordering being performed in accordance with set of predefined priority rules.

19. The non-transitory computer-readable storage medium of claim 18, wherein executing the instructions by the one or more processors, further causes the computing device to perform operations comprising ordering the respective nodes of the decision navigation graph to form a second decision pre-tree, the second decision pre-tree being a second fragment of the supported decision tree.

20. The non-transitory computer-readable storage medium of claim 19, wherein executing the instructions by the one or more processors, further causes the computing device to perform operations comprising:
assigning linguistic information comprising an entity type, one or more entity attributes, and one or more rhetorical relationships to each node of the decision pre-tree and the second decision pre-tree; and merging the decision pre-tree and the second decision pre-tree to form the supported decision tree.

\* \* \* \* \*

UNITED STATES PATENT AND TRADEMARK OFFICE
CERTIFICATE OF CORRECTION

PATENT NO. : 11,847,411 B2
APPLICATION NO. : 17/339899
DATED : December 19, 2023
INVENTOR(S) : Galitsky It is certified that error appears in the above-identified patent and that said Letters Patent is hereby corrected as shown below:

In the Specification

In Column 5, Line 49, delete "the extracted" and insert -- 1) the extracted --, therefor.

In Column 13, Line 16, delete "chomosome" and insert -- chromosome --, therefor.

In Column 13, Line 16, delete "SubcellularLocation" and insert -- Subcellular Location --, therefor.

In Column 13, Line 19, delete "isAssociatedWithProcess" and insert -- is Associated With Process --, therefor.

In Column 14, Line 65, delete "control( )" and insert -- control(_) --, therefor.

In Column 16, Line 8, delete "may be may be" and insert -- may be --, therefor.

In Column 26, Line 12, delete "Ski®" and insert -- Siri® --, therefor.

Signed and Sealed this
Seventh Day of May, 2024

Katherine Kelly Vidal
*Director of the United States Patent and Trademark Office*